United States Patent
Dow et al.

(10) Patent No.: US 11,016,466 B2
(45) Date of Patent: May 25, 2021

(54) METHOD OF DESIGNING AND OPTIMIZING FIXED CUTTER DRILL BITS USING DYNAMIC CUTTER VELOCITY, DISPLACEMENT, FORCES AND WORK

(71) Applicant: SMITH INTERNATIONAL, INC., Houston, TX (US)

(72) Inventors: Andrew Dow, Magnolia, TX (US); Crystal Brown Mayer, Houston, TX (US); Carlos Alberto Armada, Houston, TX (US); Balasubramanian Durairajan, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 483 days.

(21) Appl. No.: 15/573,136

(22) PCT Filed: May 11, 2016

(86) PCT No.: PCT/US2016/031813
§ 371 (c)(1),
(2) Date: Nov. 10, 2017

(87) PCT Pub. No.: WO2016/183172
PCT Pub. Date: Nov. 17, 2016

(65) Prior Publication Data
US 2018/0088552 A1    Mar. 29, 2018

Related U.S. Application Data

(60) Provisional application No. 62/159,830, filed on May 11, 2015.

(51) Int. Cl.
*G05B 19/31*    (2006.01)
*G01N 3/58*    (2006.01)
(Continued)

(52) U.S. Cl.
CPC .............. *G05B 19/31* (2013.01); *E21B 10/00* (2013.01); *E21B 10/46* (2013.01);
(Continued)

(58) Field of Classification Search
CPC ..... G05B 19/31; E21B 10/00; E21B 41/0092; E21B 10/46; G01M 13/00
(Continued)

(56) References Cited

U.S. PATENT DOCUMENTS

| 4,408,671 A | 10/1983 | Munson |
| 4,475,606 A | 10/1984 | Crow |

(Continued)

FOREIGN PATENT DOCUMENTS

| BE | 1013217 A6 | 10/2001 |
| CA | 2536684 A1 | 1/2005 |

(Continued)

OTHER PUBLICATIONS

International Search Report and Written Opinion issued in International Patent application PCT/US2016/031813, dated Jul. 26, 2016. 19 pages.

(Continued)

*Primary Examiner* — Iftekhar A Khan

(57) ABSTRACT

A method includes simulating a cutting tool drilling an earth formation by incrementally rotating the cutting tool at a plurality of time intervals, determining a true trajectory of a cutting element disposed on the cutting tool for the duration of the plurality of time intervals, and determining a dynamic work profile for the cutting element based on the true trajectory and a force acting on the cutting element at each time interval.

22 Claims, 11 Drawing Sheets

(51) Int. Cl.
  *E21B 10/00* (2006.01)
  *E21B 10/46* (2006.01)
  *E21B 41/00* (2006.01)
  *E21B 49/00* (2006.01)
  *E21B 7/06* (2006.01)
  *E21B 10/54* (2006.01)
  *E21B 17/10* (2006.01)

(52) U.S. Cl.
  CPC .......... *E21B 41/0092* (2013.01); *E21B 49/00* (2013.01); *G01N 3/58* (2013.01); *E21B 7/067* (2013.01); *E21B 10/54* (2013.01); *E21B 17/1078* (2013.01); *G01N 2203/0212* (2013.01); *G05B 2219/36363* (2013.01)

(58) Field of Classification Search
  USPC .......................................................... 703/10
  See application file for complete search history.

(56) References Cited

U.S. PATENT DOCUMENTS

| | | | |
|---|---|---|---|
| 4,815,342 A | 3/1989 | Brett et al. | |
| 4,862,974 A | 9/1989 | Warren et al. | |
| 4,932,484 A | 6/1990 | Warren et al. | |
| 4,982,802 A | 1/1991 | Warren et al. | |
| 5,010,789 A | 4/1991 | Brett et al. | |
| 5,042,596 A | 8/1991 | Brett et al. | |
| 5,131,478 A | 7/1992 | Brett et al. | |
| 5,178,222 A | 1/1993 | Jones et al. | |
| 5,213,168 A | 5/1993 | Warren et al. | |
| RE34,435 E | 11/1993 | Warren et al. | |
| 5,373,908 A | 12/1994 | Pastusek | |
| 5,456,141 A | 10/1995 | Ho | |
| 5,605,198 A | 2/1997 | Tibbitts et al. | |
| 5,613,093 A | 3/1997 | Kolb | |
| 5,787,022 A | 7/1998 | Tibbitts et al. | |
| 5,803,196 A | 9/1998 | Fielder | |
| 5,857,531 A | 1/1999 | Estep et al. | |
| 5,864,058 A | 1/1999 | Chen | |
| 5,868,213 A | 2/1999 | Cisneros et al. | |
| 5,903,743 A | 5/1999 | Kolb | |
| 5,950,747 A | 9/1999 | Tibbitts et al. | |
| 6,021,377 A | 2/2000 | Dubinsky et al. | |
| 6,021,859 A | 2/2000 | Tibbitts et al. | |
| 6,039,131 A | 3/2000 | Beaton | |
| 6,095,262 A | 8/2000 | Chen | |
| 6,213,225 B1 | 4/2001 | Chen | |
| 6,233,524 B1 | 5/2001 | Harrell et al. | |
| 6,241,034 B1 | 6/2001 | Steinke et al. | |
| 6,269,893 B1 | 8/2001 | Beaton et al. | |
| 6,290,006 B1 | 9/2001 | Crawford | |
| 6,298,930 B1 | 10/2001 | Sinor et al. | |
| 6,349,595 B1 | 2/2002 | Civolani et al. | |
| 6,401,839 B1 | 6/2002 | Chen | |
| 6,412,577 B1* | 7/2002 | Chen .................... E21B 10/08 175/374 | |
| 6,435,058 B1 | 8/2002 | Matthias et al. | |
| 6,516,293 B1 | 2/2003 | Huang et al. | |
| 6,536,543 B2 | 3/2003 | Meiners et al. | |
| 6,619,411 B2* | 9/2003 | Singh .................... E21B 10/16 175/39 | |
| 6,695,073 B2 | 2/2004 | Glass et al. | |
| 6,695,076 B2 | 2/2004 | Masui et al. | |
| 6,711,969 B2 | 3/2004 | Meiners et al. | |
| 6,729,420 B2 | 5/2004 | Mensa-Wilmot | |
| 6,785,641 B1 | 8/2004 | Huang | |
| 6,873,947 B1 | 3/2005 | Huang et al. | |
| 7,020,597 B2 | 3/2006 | Oliver et al. | |
| 7,085,696 B2 | 8/2006 | King | |
| 7,139,689 B2 | 11/2006 | Huang | |
| 7,258,175 B2 | 8/2007 | Veeningen et al. | |
| 7,260,514 B2* | 8/2007 | Huang .................... E21B 10/16 175/57 | |
| 7,464,013 B2 | 12/2008 | Huang et al. | |
| 7,693,692 B2 | 4/2010 | Fujinuma | |
| 7,693,695 B2* | 4/2010 | Huang .................... E21B 10/00 703/7 | |
| 7,778,777 B2* | 8/2010 | Chen ...................... E21B 7/064 702/2 | |
| 7,831,419 B2 | 11/2010 | Cariveau et al. | |
| 7,844,426 B2 | 11/2010 | Huang | |
| 8,401,831 B2 | 3/2013 | Tang et al. | |
| 8,589,124 B2 | 11/2013 | Huang | |
| 8,636,085 B2* | 1/2014 | Rinzler .................... E21B 7/14 175/16 | |
| 8,757,299 B2* | 6/2014 | DiGiovanni .......... E21B 10/567 175/428 | |
| 8,798,978 B2* | 8/2014 | Ertas .................... E21B 44/00 703/10 | |
| 8,978,788 B2* | 3/2015 | Vempati ................ C22C 26/00 175/432 | |
| 9,243,452 B2* | 1/2016 | DiGiovanni ............ E21B 10/60 | |
| 9,388,639 B2* | 7/2016 | Patel ...................... E21B 10/60 | |
| 9,428,966 B2* | 8/2016 | Patel .................... B24D 99/005 | |
| 9,821,437 B2* | 11/2017 | Bilen .................. E21B 10/5676 | |
| 2003/0034176 A1* | 2/2003 | Singh .................... E21B 10/16 175/57 | |
| 2003/0051918 A1* | 3/2003 | Chen .................... E21B 10/16 175/57 | |
| 2003/0178232 A1 | 9/2003 | Mensa-Wilmot | |
| 2004/0000430 A1 | 1/2004 | King | |
| 2004/0143427 A1 | 7/2004 | Huang et al. | |
| 2004/0230413 A1* | 11/2004 | Chen ...................... E21B 10/16 703/10 | |
| 2004/0238219 A1 | 12/2004 | Nichols et al. | |
| 2005/0015229 A1* | 1/2005 | Huang .................... E21B 10/16 703/10 | |
| 2005/0056463 A1 | 3/2005 | Aronstam et al. | |
| 2005/0096847 A1* | 5/2005 | Huang .................... E21B 44/00 702/9 | |
| 2005/0133272 A1* | 6/2005 | Huang .................... E21B 10/00 175/327 | |
| 2005/0165589 A1* | 7/2005 | Huang .................... E21B 10/16 703/6 | |
| 2005/0273302 A1* | 12/2005 | Huang .................... E21B 44/00 703/10 | |
| 2006/0167668 A1* | 7/2006 | Cariveau ................ E21B 10/00 703/7 | |
| 2006/0167669 A1* | 7/2006 | Cariveau ................ E21B 10/00 703/7 | |
| 2007/0005316 A1* | 1/2007 | Paez ...................... E21B 10/43 703/10 | |
| 2007/0021857 A1* | 1/2007 | Huang .................... E21B 10/00 700/117 | |
| 2007/0067147 A1* | 3/2007 | Huang .................... E21B 44/00 703/7 | |
| 2007/0106487 A1* | 5/2007 | Gavia .................... E21B 10/00 703/7 | |
| 2007/0192074 A1* | 8/2007 | Chen ...................... E21B 41/00 703/10 | |
| 2007/0272442 A1* | 11/2007 | Pastusek .............. E21B 47/017 175/40 | |
| 2007/0278017 A1* | 12/2007 | Shen .................. E21B 10/5673 175/426 | |
| 2008/0029308 A1* | 2/2008 | Chen ...................... E21B 10/16 175/331 | |
| 2008/0255817 A1* | 10/2008 | Pabon .................... E21B 44/00 703/10 | |
| 2009/0055135 A1* | 2/2009 | Tang ...................... E21B 10/54 703/1 | |
| 2010/0000800 A1* | 1/2010 | Chen .................. E21B 10/5735 175/430 | |
| 2010/0054875 A1 | 3/2010 | Hall et al. | |
| 2010/0155149 A1* | 6/2010 | Keshavan .............. E21B 10/43 175/428 | |
| 2010/0211362 A1* | 8/2010 | Huang .................... E21B 10/00 703/1 | |
| 2011/0120772 A1* | 5/2011 | McLoughlin .......... E21B 17/07 175/56 | |
| 2011/0148021 A1 | 6/2011 | Reese et al. | |

(56) References Cited

U.S. PATENT DOCUMENTS

| | | | | |
|---|---|---|---|---|
| 2012/0130693 | A1* | 5/2012 | Ertas | E21B 45/00 703/2 |
| 2014/0095134 | A1 | 4/2014 | Cariveau et al. | |
| 2014/0136168 | A1 | 5/2014 | Spencer et al. | |
| 2014/0250994 | A1 | 9/2014 | Gledhill et al. | |
| 2014/0309978 | A1* | 10/2014 | Chen | E21B 44/00 703/7 |
| 2015/0176344 | A1* | 6/2015 | McLoughlin | E21B 17/1078 175/24 |
| 2015/0285006 | A1* | 10/2015 | Dow | E21B 10/43 175/57 |
| 2016/0208597 | A1* | 7/2016 | Wang | E21B 44/02 |
| 2016/0362972 | A1* | 12/2016 | Dykstra | G01L 3/02 |
| 2018/0106113 | A1* | 4/2018 | McDonough | E21B 10/16 |

FOREIGN PATENT DOCUMENTS

| | | |
|---|---|---|
| EP | 0467580 A1 | 1/1992 |
| EP | 0728912 A2 | 8/1996 |
| EP | 0972908 A2 | 1/2000 |
| EP | 1146200 A1 | 10/2001 |
| GB | 2241266 A | 8/1991 |
| GB | 2300208 A | 10/1996 |
| GB | 2339815 A | 2/2000 |
| GB | 2346628 A | 8/2000 |
| GB | 2357534 A | 6/2001 |
| GB | 2367843 A | 4/2002 |
| GB | 2379699 A | 3/2003 |
| SU | 933932 A1 | 6/1982 |
| SU | 1461855 A1 | 2/1989 |
| SU | 1654515 A1 | 6/1991 |
| SU | 1691497 A1 | 11/1991 |
| WO | 0012859 A2 | 3/2000 |
| WO | 0012860 A2 | 3/2000 |
| WO | 0133027 A2 | 5/2001 |
| WO | 02077407 A1 | 10/2002 |
| WO | 2016183219 A1 | 11/2016 |

OTHER PUBLICATIONS

International Preliminary Report on Patentability issued in International Patent application No. PCT/US2016/031813, dated Nov. 23, 2017, 14 pages.

International Search Report and Written Opinion issued in International Patent application No. PCT/US2016/031892, dated Aug. 16, 2016, 19 pages.

International Preliminary Report on Patentability issued in International Patent application PCT/US2016/031892, dated Nov. 23, 2017, 10 pages.

Combined Search and Examination Report under Sections 17 and 18(3) issued in British Application No. GB06013163, dated Apr. 20, 2006, 9 pages.

Office Action issued in Canadian Patent Application No. 2,532,753 dated Mar. 11, 2010, 4 pages.

Office Action issued in Canadian Patent Application No. 2,532,753, dated Mar. 6, 2008, 3 pages.

Office Action issued in Canadian Patent Application No. 2532753 dated Apr. 25, 2007, 2 pages.

Examination Report issued in Canadian Patent Application No. 2738687 dated Feb. 3, 2015, 3 pages.

Office Action issued in Canadian Patent Application No. 2738687, dated Aug. 8, 2013, 3 pages.

Office Action issued in U.S. Appl. No. 11/041,911, dated Apr. 17, 2008, 27 pages.

Office Action issued in U.S. Appl. No. 11/041,911, dated May 4, 2007, 28 pages.

Office Action issued in U.S. Appl. No. 11/041,910, dated Nov. 21, 2008, 14 pages.

Office Action issued in U.S. Appl. No. 11/041,910 dated Jun. 23, 2008, 15 pages.

Office Action issued in U.S. Appl. No. 11/041,910 dated Aug. 3, 2007, 15 pages.

Office Action issued in U.S. Appl. No. 11/041,910 dated Feb. 27, 2007, 21 pages.

Al-Hiddabi, S. A. et al., "Non-linear control of torsional and bending vibrations of oilwell drillstrings", Journal of Sound and Vibration, 265, 203, pp. 401-415.

Behr, S. M. et al , "Three-Dimensional Modeling of PDC Bits", SPE/IADC 21928, presented the the 1991 SPE/IADC Drilling Conference, Amsterdam, The Netherlands, 1991, 9 pages.

Brakel, J. D. et al, "Prediction of Wellbore Trajectory Considering Bottomhole Assembly and Drill-Bit Dynamics", SPE Drilling Engineering, 1989, 10 pages.

Brett, J. F. et al., A Method of Modeling the Directional Behavior of Bottomhole Assemblies Including Those With Bent Suband Downhole Motors, IADC/SPE 14767, presented at the 1986 IADC/SPE Drilling Conference held in Dallas, Texas, U.S.A., 12 pages.

Certification and Notarization dated Nov. 12, 2003 from Universe Technical Translation for English Translations of SU-933932; SU-295857; SU-398733; SU-420749; SU-229371: SU-436147; and SU-515867, 1 page.

Chen, S. L. et al., "Field Investigation of the Effects of Stick-Slip, Lateral, and Whirl Vibrations on Roller Cone Bit Performance", SPE 56439, presented at the SPE Annual Technical Conference and Exhibition, Houston, Texas, U.S.A. 1999 10 pages.

Chen, S. L. et al., "Development and Application of a New Roller Cone Bit with Optimized Tooth Orientation", SPE 71053, presented at the SPE Rocky Mountain Petroleum Technology Confference, Keystone, Colorado, U.S.A., 2001, 15 pages.

Chen, S. L. et al., "Development and Field Applications of Roller Cone Bits with Balanced Cutting Structure", SPE 71393, presented at the 2001 SPE/ATCE Annual Meeting, New Orleans, Louisiana, U.S.A. 2001, 11 pages.

Christoforou, A. P. et al., "Dynamic Modelling of Rotating Drillstrings with Borehole Interactions", Journal of Sound and Vibration, 1997, 206(2) pp. 243-260.

Clayton, R. I. et al, Development of Whirl Resistant PDC Bits, SPE 26954, presented at the Latin American/Caribbean Petroleum Engineering Conference, 1994, 13 pages.

Cooley, C. H. et al. "The Design and Testing of Anti-Whirl Bits", SPE 24586, presented at the 67th Annual Technical Conference and Exhibition, Washington, District of Columbia, U.S.A., 1992, 10 pages.

Ertunc, H. M. et al., "Real Time Monitoring of Tool Wear Using Multiple Modeling Method", IEEE International Electric Machines and Drives Conference IEMDC 2001, pp. 687-691.

Glowka, D. A. et al., "Progress in the Advanced Synthetic-Diamond Drill Bit Program", ASME International, 1995, pp. 87-95.

Glowka, D. A., "Use of Single-Cutter Data in the Analysis of PDC Bit Designs: Part 2, Development and Use of the PDCWEAR Computer Code", Journal of Petroleum Technology, 1989, 41(8), pp. 850-859.

Glowka, D. A., "Use of Single-Cutter Data in the Analysis of PDC Bit Designs: Part 1—Development of a PDC Cutting Force Model", Journal of Petroleum Technology, 1989, 41(8), pp. 797-799, 844-849.

Glowka, D. A., "Development of a Method for Predicting the Performance and Wear of PDC Drill Bits", Sandia Report No. SAND86-1745, 1987, 124 pages.

Guo, B. et al, "Bit Wobble: A Kinetic Interpretation of PDC Bit Failure", SPE 28313, presented at the SPE 69th Annual Technical Conference and Exhibition, New Orleans, Louisiana, U.S.A., 1994, 14 pages.

Hancke, G. P. et al., "A Control System for Optimizing Deep Hole Drilling Conditions", IECON 1991 International Conference on Industrial Electronics, Control and Instrumentation, 1991, pp. 2279-2284.

Hancke, G. P., "The Effective Control of a Deep Hole Diamond Drill", Conference Record af the IEEE Industry Applications Society Annual Meeting, 1991, pp. 1200-1205.

Hanson, J. M. et al., "Dynamics Modeling of PDC Bits", SPE/IADC 29401, presented at the 1995 SPE/IADC Drilling Conference, Amsterdam, The Netherlands, 1995, 16 pages.

(56) References Cited

OTHER PUBLICATIONS

Ho, H-S., "Prediction of Drilling Trajectory in Directional Wells via a New Rock-Bit Interaction Model", SPE 16658, presented at the 62nd Annual Technical Conference and Exhibitiin, Dallas, Texas, U.S.A., 1987, 13 pages.

Howie, W. L. et al., "A Smart Bolter for Improving Entry Stability", Conference Record of the IEEE Industry Applications Society Annual Meeting. 1989, pp. 1556-1564.

Langeveld, C. .J., "PDC Bit Dynamics", IADC/SPE 23867, presented at the 1992 IADC/SPE Drilling Conference, New Orleans, Louisiana, U.S.A., 1992, 15 pages.

Ma, D. et al., "A New Way to Characterize the Gouging-Scraping Action of Roller Cone Bits." SPE 19448, 1989, 24 pages.

Ma, D. et al., "Dynamics of Roller Cone Bits", Journal of Energy Resources Technology, 1985, 107(4), pp. 543-548.

Ma et al., "The Computer Simulation of the Interaction Between Roller Bit and Rock" SPE 29922, presented at the International Meeting on Petroleum Engineering, Beijing, PR China, 1995, pp. 309-317.

Ma, D. et al., "The Operational Mechanics of the Rock Bit", Petroleum Industry Press, Beijing, P.R. China, 1996, pp. 1-243.

McIntyre, R. L., "Surface Mine Rotary Drilling", Abstract in Australian Mineral Foundations Workshop Course 1985, Drilling and Blasting in Surface Coal Mines, Brisbane, Queensland, Australia, 1985, Smith-Gruner, 3 pages.

Menand, S. et al., "How the Bit Profile and Gages Affect the Well Trajectory", IADC/SPE 74459, presented at the IADC/SPE Drilling conference, Dallas, Texas, U.S.A., 2002, 13 pages.

RockBit International System Designed to Speed Continuous Coring Operation, 1995, 4 pages.

RockBit International, "If You've Ever Doubted RBIs Ability to Drill at a Lower Cost Per Foot . . . Ask the Folks Drilling This Well", Product Brochure, 4 pages.

RockBit International, "The Leader in High-Speed Drill Bit Technology" Company Brochure, 1995, 24 pages.

"Sandvik Rock Bits", Sandvik in the World of Oil and Gas, Product Brochure, 1988, 8 pages.

Sengupta, A. K., "Numerical Simulation of the Roller Cone Drill Bit Lift-Off Phenomenon", Masters Thesis, Rice University, 1994, 134 pages.

Steklianov, B.L. , "Increasing the Efficiency of Rock-Cutting Tools on the Basis of Comparative Analysis of the Kinetic Characteristics of Their Cutting Structure", NDERI, 1990, 24 pages.

Steklyanov, B. L. et al., "Improving the Effectiveness of Drilling Tools", KhM-3 Oil Industry Machine Building, Information Summary, 1991, pp. 1-35.

Translation of description of Russian Grant No. 933932 dated Jun. 7, 1982, 2 pages.

Wang, Y. et al., "Two-Dimensional Rigid-Body Collisions with Friction", Journal of Applied Mechanics, 1992, 59, pp. 635-642.

Brett, J. F. et al, "Bit Whirl—A New Theory of PDC Bit Failure", SPE Drilling Engineering, 1990, pp. 275-281.

Warren, T. M. et al., "Development of a Whirl-Resistant Bit", SPE Drilling Engineering, 1990, pp. 267-274.

Warren et al., "Drag Bit Performance Modeling", SPE Drilling Engineering, 1989, 4(2), pp. 119-127.

Chen, S., "Linear and Nonlinear Dynamics of Drillstrings", Doctorate Thesis, 1994-1995, 164 pages.

"Drill Bit Design, Simulation and Optimization", Google Search performed Dec. 11, 2015 in U.S. Appl. No. 14/037,114 non-final rejection, 2 pages.

Office Action issue in U.S. Appl. No. 14/037,114 dated Feb. 5, 2016, 10 pages.

Office Action issue in U.S. Appl. No. 14/037,114 dated Nov. 16, 2016, 12 pages.

Office Action issued in U.S. Appl. No. 11/041,911, dated Aug. 22, 2007, 10 pages.

Office Action issued in U.S. Appl. No. 11/041,911, dated Sep. 24, 2008, 16 pages.

U.S. Appl. No. 60/485,642, filed Jul. 9, 2003, 77 pages.

\* cited by examiner

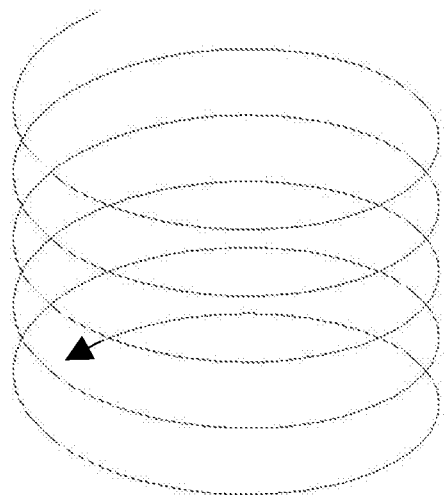
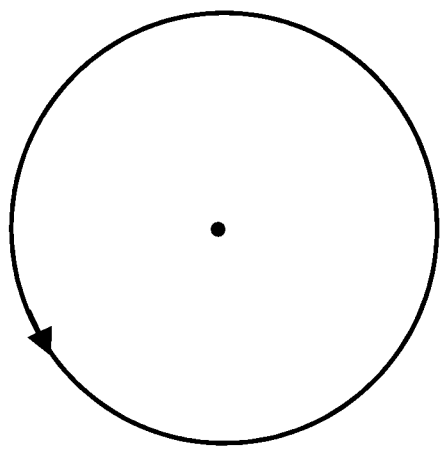
FIG. 3A  FIG. 3B
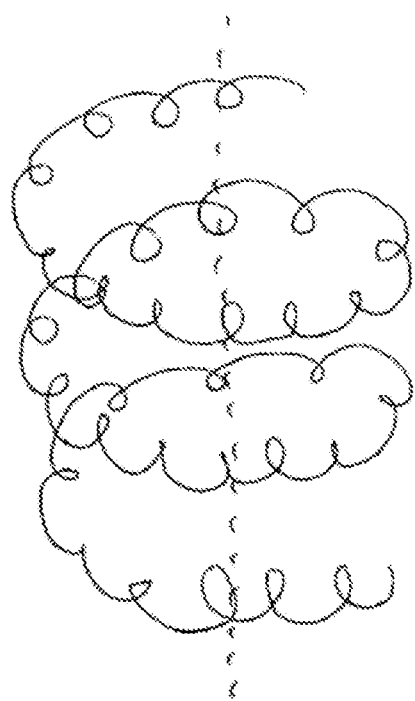
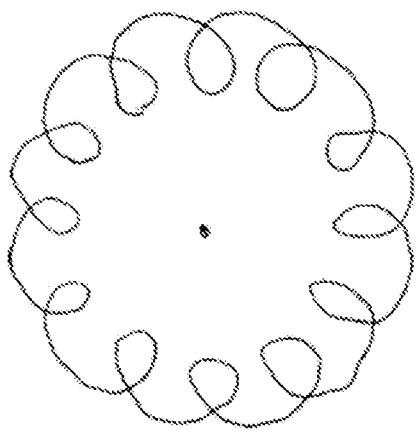
FIG. 3C  FIG. 3D

METHOD OF DESIGNING AND OPTIMIZING FIXED CUTTER DRILL BITS USING DYNAMIC CUTTER VELOCITY, DISPLACEMENT, FORCES AND WORK

BACKGROUND

Operations, such as geophysical surveying, drilling, drilling, logging, well completion, hydraulic fracturing, steam injection, and production, are typically performed to locate and gather valuable subterranean assets, such as valuable fluids or minerals. The subterranean assets are not limited to hydrocarbons such as oil or gas. After gathering valuable subterranean assets, operations such as well abandonment may involve the sealing of a well to safely and economically decommission a well.

Significant expense is involved in the design and manufacture of drilling, production, and other downhole equipment, such as drill bits. Having accurate models for predicting and analyzing drilling and performance characteristics of drill bits and other downhole tools can greatly reduce the cost associated with manufacturing downhole equipment and designing drilling operations because these models can be used to more accurately predict the performance of bits prior to their manufacture and/or use for a particular drilling application. For these reasons, models have been developed and employed for the analysis and design of drill bits.

Two of the most widely used methods for modeling the performance of drill bits or designing drill bits are disclosed in Sandia Report No. SAN86-1745 by David A. Glowka, printed September 1987 and titled "Development of a Method for Predicting the Performance and Wear of PDC drill Bits" and U.S. Pat. No. 4,815,342 to Bret, et al. and titled "Method for Modeling and Building Drill Bits." While these models have been useful in that they provide a means for analyzing the forces acting on the bit, using them may not result in a most accurate reflection of drilling because these models rely on generalized theoretical approximations (typically some equations) of cutter and formation interaction that may not be a good representation of the actual interaction between a particular cutting element and the particular formation to be drilled. Assuming that the same general relationship can be applied to all cutters and all earth formations, even though the constants in the relationship are adjusted, may result in an inaccurate prediction of the response of an actual bit drilling in earth formation.

U.S. Pat. No. 8,589,124 discloses a method for determining interaction forces between cutting elements and a formation, determining the relative sliding velocity of an area of a cutting element during drilling, and calculating a wear rate of the area of the cutting element based on the interaction forces and relative sliding velocity Throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into subterranean structures using boreholes and the operations associated with this process. Further, the term "field operation" refers to a field operation associated with a field, including activities related to field planning, wellbore drilling, wellbore completion, production using the wellbore (also referred to as borehole), and abandonment of a well after production has completed (well sealing).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes simulating a cutting tool drilling an earth formation by incrementally rotating the cutting tool at a plurality of time intervals, determining a true trajectory of a cutting element disposed on the cutting tool for the duration of the plurality of time intervals, and determining a dynamic work profile for the cutting element based on the true trajectory and a force acting on the cutting element at each time interval.

In another aspect, embodiments disclosed herein relate to a method of designing a bottom hole assembly that includes simulating drilling an earth formation using the bottom hole assembly, determining one or more cutting elements subjected to cyclic loading, altering at least one input parameter selected from the group consisting of cutting tool parameters, drilling operating parameters and bottom hole assembly parameters, and repeating simulating, determining and altering until a desired cutting tool design is reached.

In yet another aspect, embodiments disclosed herein relate to a bottom hole assembly that includes a cutting tool having a tool body, a first cutting element disposed on the tool body in a first region subjected to a first cyclic loading profile in a simulation of the bottom hole assembly, and a second cutting element disposed on the tool body in a second region subjected to a second cyclic loading profile in a simulation of the bottom hole assembly, wherein the first cyclic loading profile has one or more of a greater average amplitude, a greater average frequency, and a greater average duration relative to the second cyclic loading profile, and where the first cutting element has one or more of a greater fatigue strength and a greater impact resistance than the second cutting element.

Other aspects and advantages of the disclosure will be apparent from the following description and the appended claims.

BRIEF DESCRIPTION OF DRAWINGS

FIGS. 3A-B show a side and axial view, respectively, of an idealized helical trajectory of a cutting element during a drilling simulation.

FIGS. 3C-D show a side and axial view, respectively, or a true trajectory of a cutting element during a drilling simulation according to embodiments of the present disclosure.

DETAILED DESCRIPTION

Figure 1:
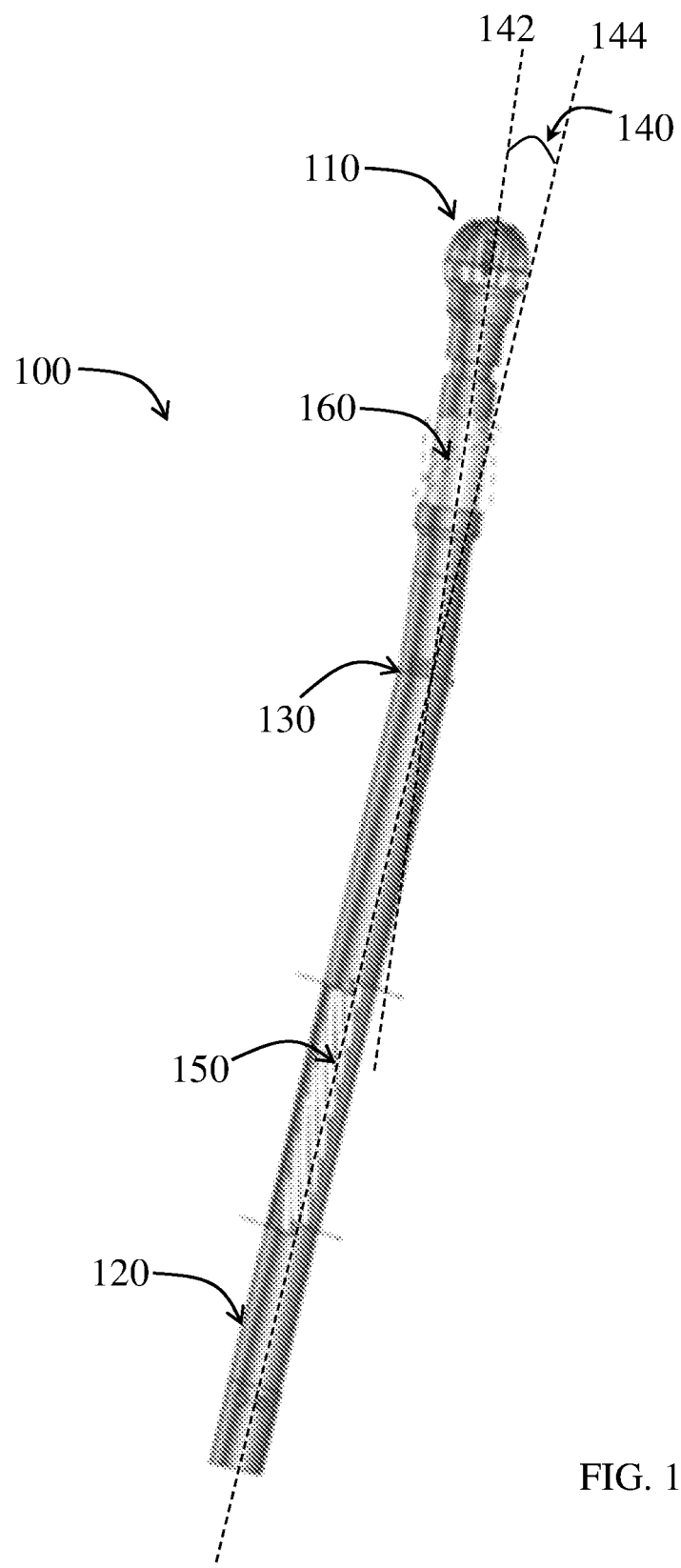
FIG. 1 shows a bent motor bottom-hole assembly according to embodiments of the present disclosure.

Embodiments are shown in the above-identified drawings and described below. In describing the embodiments, like or identical reference numerals are used to identify common or similar elements. The drawings are not necessarily to scale and certain features may be shown exaggerated in scale or in schematic in the interest of clarity and conciseness.

The present disclosure provides methods for modeling a true trajectory of cutting elements on a downhole cutting tool during downhole operations. As used herein, a "true trajectory" of a cutting element refers to an actual or more accurately predicted trajectory of the cutting element during downhole operations. For example, a true trajectory of a cutting element may be calculated relative to the axis of the cutting tool on which the cutting element is disposed as opposed to the axis of the wellbore or direction of drilling. Methods in accordance with one or more embodiments of the present disclosure may be used to predict the true trajectory of a cutting element, to design a downhole cutting tool (e.g., a drill bit or reamer) based on the true trajectory of the cutting element, to optimize the performance of a downhole cutting tool, to optimize the response of an entire drill string during drilling, or to generate visual displays of drilling.

In accordance with one aspect of the present disclosure, modeling the true trajectory of one or more cutting elements may be conducted in a separate step from modeling the trajectory of a cutting tool on which the cutting elements are disposed. For example, a method of modeling a true trajectory of a cutting element may include generating a geometric model of a downhole cutting tool (e.g., a drill bit) and a geometric model of the earth formation to be represented as drilled. The modeled cutting tool may then be incrementally rotated on the formation, and the interaction between the cutting elements on the cutting tool and the earth formation during the incremental rotation may be calculated. In an additional step, the true trajectory of the cutting elements may be determined based on data from a cutting element/formation interaction model and the calculated interaction between the bit and the earth formation. From determining the true trajectory of the cutting elements on a cutting tool, the inventors of the present disclosure have found that during operation, cutting elements may be subjected to more cyclical loading than was otherwise known. Cyclical loading may occur, for example, from bit bounce, bit whirl, unexpected movements during drilling, from assemblies having multiple axes of rotation or assemblies subjected to opposing forces. Further, a dynamic work of cutting elements may be determined by determining the true trajectory of the cutting elements. As used herein, "dynamic work" refers to a changing work of a cutting element as the cutting element moves.

FIG. 1 shows an example of a bottom hole assembly ("BHA") 100 that extends downward into a wellbore, the bottom hole assembly having a drill bit 110 coupled to a drill string 120. As used herein, "coupled to" may include either an indirect or direct physical connection. In FIG. 1, the BHA is inverted, with the drilling direction (into the formation) being toward the top of the page. The drill string 120 has a bent section 130, which may be formed from a bent housing or a bent sub. The bent section may have a bend angle 140 formed between the axis 142 of the drill string on one side of the bent section and the axis 144 of the drill string on the opposite side of the bent section. The bent section may have a fixed bend angle or an adjustable bend angle, and may range, for example, from 0 to about 2.5°. The drill bit 110 may be any bit including fixed cutters, inserts, teeth, and the like, for example, a polycrystalline diamond ("PCD") bit. A motor 150 may be oriented along the drill string to rotate the drill bit 110, where the motor 150 may be on either side of the bent section.

The drill string 120 may include several joints of drill pipe connected end to end through tool joints. The drill string 120 may be used to transmit drilling fluid (through its hollow core) and to transmit rotational power from a drill rig to the BHA 100. In some cases the drill string 120 further includes additional components such as subs, pup joints, etc. BHAs may also include additional components such as drill collars, stabilizers (e.g., 160 shown in FIG. 1), measurement-while-drilling (MWD) tools, logging-while-drilling (LWD) tools, subs, hole enlargement devices (e.g., hole openers and reamers), jars, accelerators, thrusters, downhole motors, and rotary steerable systems.

When drilling, sufficient rotational moment and axial force must be applied to the bit 110 to cause the cutting elements of the bit 110 to cut into material and/or crush the formation as the bit 110 is rotated. The axial force applied on the bit 110 is referred to as the "weight on bit" (WOB). The rotational moment applied to the drilling tool assembly 100 at the drill rig (usually by a rotary table or a top drive mechanism) to turn the drilling tool assembly 100 is referred to as the "rotary torque." Additionally, the speed at which the rotary table rotates the drilling tool assembly 100, measured in revolutions per minute (RPM), is referred to as the "rotary speed."

Figure 2:
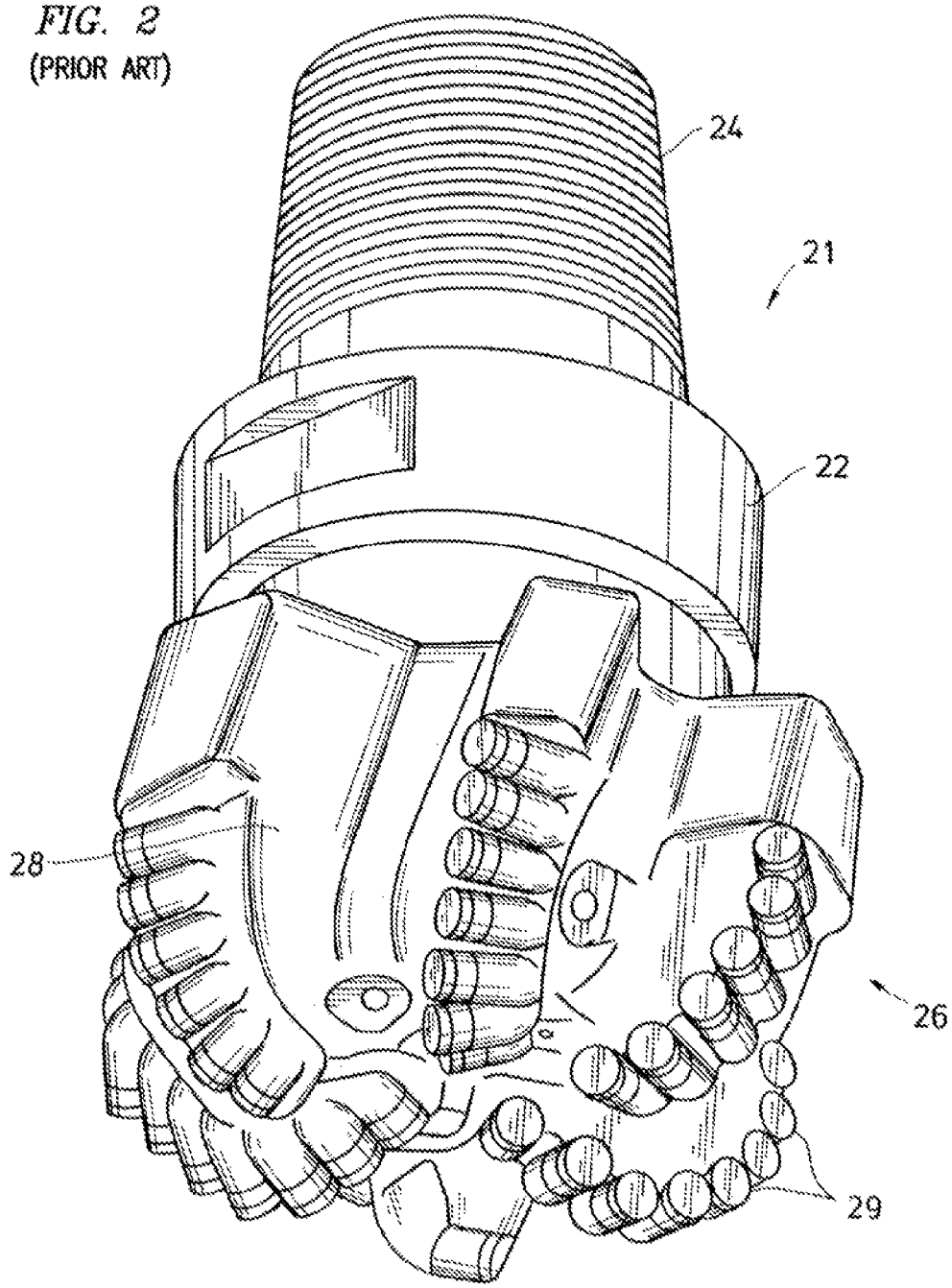
FIG. 2 shows a fixed cutter drill bit.

Drilling typically refers to using a drill bit (e.g., bit 110, FIG. 1) to remove earth formation at a distal end of a borehole. Referring to FIG. 2, an example of a drill bit known as a fixed-cutter bit is shown. Fixed-cutter bit 21 has a bit body 22 having a threaded connection at one end 24 and a cutting head 26 formed at the other end. The head 26 of the fixed-cutter bit 21 includes a plurality of ribs or blades 28 arranged about the rotational axis of the drill bit and extending radially outward from the bit body 22. Cutting elements 29 are embedded in the raised ribs 28 to cut formation as the drill bit is rotated on a bottom surface of a well bore. Cutting elements 29 of fixed-cutter bits include polycrystalline diamond compacts (PDC) or specially manufactured diamond cutters. These drill bits are also referred to as PDC bits or drag bits.

In order to optimize performance, engineers may consider a variety of factors to design and manufacture drilling and operating equipment. For example, when selecting and/or designing a BHA, engineers may consider a rock profile (e.g., the type of rock or the geologic characteristics of an earth formation), different forces acting on the BHA, drilling performance parameters, drill bit parameters, and/or well bore parameters, among many others. However, without accurate models or simulations of BHAs and how they operate in a given condition, engineers may not be provided with enough quantitative and substantial information to make an optimal or preferred BHA choice. Therefore, comparison of drill bit components as well as different drill bit parameters, wellbore parameters, and drilling operating parameters may be helpful in determining the optimal BHA to be used during a particular drilling technique.

Further, unexpected or expected vibrational forces from, for example, bit bounce and bit whirl, as well as unexpected or expected forces from multiple nodes, for example, from roller cone drill bits, wellbore departure tools and directional drilling equipment, may affect performance of the drilling equipment. For example, in some cases, a driller might desire that the direction of the well bore be maintained for a certain distance. To achieve the direction, the driller may require that an angle be "built" ("build angle") into the well. A build angle is the rate that the direction of the longitudinal axis of the well bore changes, which is commonly measured in degrees per 100 feet. The extent of the build angle may also be referred to as the "dogleg severity." Another important directional aspect is the "walk" rate. The walk rate refers to the change in azimuthal (compass) direction of the well bore. Control and prediction of the drilling direction is important for reaching target zones containing hydrocarbons.

Accordingly, embodiments disclosed herein provide models that may more accurately reflect the effect of such forces, for example, by determining a true trajectory of the cutting elements on a cutting tool (in addition to simulating the cutting tool). In some embodiments, the models may be used to analyze the steerability of a given bit design to determine whether a certain bit design may be useful. According to some embodiments of the present disclosure, methods and techniques are provided to model the behavior of various BHA packages, including, for example, straight hole motor BHAs, bent motor BHAs, and other directional drilling BHAs, under multiple conditions to achieve an optimal BHA package for a given drilling operation.

"Well bore parameters" may include one or more of the following: the geometry of a well bore and formation material properties (i.e. geologic characteristics). The trajectory of a well bore in which the drilling tool assembly is to be confined also is defined along with an initial well bore bottom surface geometry. Because the well bore trajectory may be straight, curved, or a combination of straight and curved sections, well bore trajectories, in general, may be defined by defining parameters for each segment of the trajectory. For example, a well bore may be defined as comprising N segments characterized by the length, diameter, inclination angle, and azimuth direction of each segment and an indication of the order of the segments (i.e., first, second, etc.).

Well bore parameters defined in this manner can then be used to mathematically produce a model of the entire well bore trajectory. Formation material properties at various depths along the well bore may also be defined and used. One of ordinary skill in the art will appreciate that well bore parameters may include additional properties, such as friction of the walls of the well bore, casing and cement properties, and well bore fluid properties, among others, without departing from the scope of the disclosure.

"BHA parameters" may include one or more of the following: the type, location, and number of components included in the drilling tool assembly; the length, internal diameter of components, outer diameter of components, weight, and material properties of each component; the type, size, weight, configuration, and material properties of the drilling tool; and the type, size, number, location, orientation, and material properties of the cutting elements on the drilling tool. Material properties in designing a drilling tool assembly may include, for example, the strength, elasticity, and density of the material. It should be understood that drilling tool assembly design parameters may include any other configuration or material property of the drilling tool assembly without departing from the scope of the disclosure.

"Bit parameters," which are a subset of BHA parameters, may include one or more of the following: bit type, size of bit, shape of bit, cutting structures on the bit, such as cutting element type, cutting element geometry, number of cutting structures, and location of cutting structures. "Cutting tool parameters," which are another subset of BHA parameters, may include bit parameters or parameters of other cutting tools (e.g., reamers), such as cutting tool type, size and shape and cutting structures on the cutting tool. As with other components in the drilling tool assembly, the material properties of the bit or other cutting tool may be defined.

"Drilling operating parameters" may include one or more of the following: the rotary table (or top drive mechanism), speed at which the drilling tool assembly is rotated (RPM), the downhole motor speed (if a downhole motor is included) and the hook load. Drilling operating parameters may further include drilling fluid parameters, such as the viscosity and density of the drilling fluid and pump pressure, for example. It should be understood that drilling operating parameters are not limited to these variables. In other embodiments, drilling operating parameters may include other variables, e.g., rotary torque and drilling fluid flow rate. Dip angle is the magnitude of the inclination of the formation from horizontal. Strike angle is the azimuth of the intersection of a plane with a horizontal surface. Additionally, drilling operating parameters for the purpose of drilling simulation may further include the total number of drill bit revolutions to be simulated, the total distance to be drilled, or the total drilling time desired for drilling simulation.

"Drilling performance" may be measured by one or more drilling performance parameters. Examples of drilling performance parameters include rate of penetration (ROP), rotary torque required to turn the drilling tool assembly, rotary speed at which the drilling tool assembly is turned, drilling tool assembly lateral, axial, or torsional vibrations and accelerations induced during drilling, WOB, weight on reamer (WOR), forces acting on components of the drilling tool assembly, and forces acting on the drill bit and components of the drill bit (e.g., on blades and/or cutting elements). Drilling performance parameters may also include the torque along the drilling tool assembly, bending moment, alternative stress, percentage of fatigue life consumed, pump pressure, stick slip, dog leg severity, borehole diameter, deformation, work rate, azimuth and inclination of the well, build up rate, walk rate, bit geometry, dynamic work of cutting elements, and cyclic loading on cutting elements. One skilled in the art will appreciate that other drilling performance parameters exist and may be considered without departing from the scope of the disclosure.

While drilling, the actual WOB is not constant. Some of the fluctuation in the force applied to the bit or reamer may be the result of the bit contacting with surfaces having harder and softer portions that break unevenly. However, in most cases, the majority of the fluctuation can be attributed to drilling tool assembly vibrations. Drilling tool assemblies can extend more than a mile in length while being less than a foot in diameter. As a result, these assemblies are relatively flexible along their length and may vibrate when driven rotationally by the rotary table. Drilling tool assembly vibrations may also result from vibration of the bit during drilling. Several modes of vibration are possible for drilling tool assemblies. In general, drilling tool assemblies may experience torsional, axial, and lateral vibrations. Although partial damping of vibration may result due to viscosity of drilling fluid, friction of the drill pipe rubbing against the wall of the well bore, friction of the casing rubbing against the wall of the well bore, energy absorbed in drilling, and drilling tool assembly impacting with borehole, these sources of damping are typically not enough to suppress vibrations completely.

The aforementioned problems may be increasingly significant when dealing with directional wells. Successful drilling operations require appropriate selection of drilling tools, fluids, and techniques. Drills, or similar cutting tools, should be appropriate for the borehole conditions and the materials to be removed. The fluids should be capable of removing drilled material from the wellbore. Additionally, the techniques employed should be appropriate for the anticipated conditions in order to achieve operation objectives.

Accordingly, in one aspect, the present disclosure provides a method of analyzing the performance of different BHAs against pre-selected criteria, against one another, and/or against data acquired in the field.

As used herein, a "drilling simulation" is a dynamic simulation of a BHA used in a drilling operation. The drilling simulation is referred to as being "dynamic" because the drilling is a "transient time simulation," meaning that it is based on time or the incremental rotation of the drilling tool assembly. Methods for such simulations are known to the assignee of the current application, such as those disclosed in U.S. Pat. Nos. 6,516,293, 6,873,947, 7,844,426, 7,139,689, 6,785,641, 7,693,695, 8,401,831, and 7,464,013 as well as U.S. patent application Ser. Nos. 10/749,019, 10/852,574, 10/851,677, 10/888,358, and 10/888,446, all of which are incorporated by reference in their entirety.

During drilling, it may be desired to change the trajectory of a borehole. For example, it may be desired to change the trajectory of a substantially vertically drilled borehole to a substantially horizontally drilled borehole (or vice versa). The transition from vertical drilling to horizontal drilling (or vice versa) is known as directional drilling. Directional drilling involves certain terms of art, which are presented below for background information.

The method used to obtain the measurements to calculate and plot a 3D well path is called a directional survey. Three parameters are measured at multiple locations along the well path—measure depth (MD), inclination, and hole direction. MD is the actual depth of the hole drilled to any point along the wellbore or the total depth as measured from the surface location. Inclination is the angle, measured in degrees, by which the wellbore or survey instrument axis varies from a true vertical line. An inclination of 0° is true vertical, and an inclination of 90° is horizontal.

Hole direction is the angle, measured in degrees, of the horizontal component of the borehole or survey-instrument axis from a known north reference. This reference is true north, magnetic north, or grid north, and is measured clockwise by convention. Hole direction is measured in degrees and is expressed in either azimuth (0 to 360°) or quadrant (Northeast (NE), Southeast (SE), Southwest (SW), Northwest (NW)) form. The "build rate" is the positive change in inclination over a normalized length (e.g., 3°/100 ft.). A negative change in inclination would be the "drop rate."

When drilling a long horizontal well (not necessarily a long-radius horizontal well), WOB may not effectively be transferred from the surface to the bit due to the large horizontal distance and axial friction from the drillstring. In addition, as the length of a well increases, the ROP of a drill bit may be reduced as WOB and/or surface RPM capabilities may not be sufficient in maintaining a specific ROP. Further, in long substantially horizontal wells, friction acting on the drill string, BHA, and/or drill bit may deleteriously affect the performance of the drilling operation and drill string and bit wear may be amplified. Of course, those having skill in the art will appreciate that many other reasons may affect the performance and/or drilling operation.

To attenuate or reduce friction, various drilling tools may be used to induce a vibration, hammering effect, or reciprocation in the drill string. For example, a shock sub may be used with an axial vibration tool to generate an axial force at a specified frequency, causing an axial vibration which oscillates the drill string and reduces friction. To generate the axial force, the axial vibration tool may be used to create and apply cyclical pressure pulses to a pump open area of the shock sub. In another example, the cyclical pressure pulses of the axial vibration tool may produce a water hammering effect, causing the axial vibration needed to oscillate the drill string and reduce friction. Further, certain tools may need an external prime mover, such as a mud motor or turbine, in order to produce the cyclical pressure pulses.

In other embodiments, axial vibration tools may be used without a shock sub. In such embodiments, the pressure pulses produced by the axial vibration tool may generate a water hammering effect, such that the pressure pulses may cause an axial vibration which travels up and down a drill string. In turn, the axial vibration may oscillate the drill string and reduce friction.

According to some embodiments of the present disclosure, a method may be provided to model a true trajectory of one or more cutting elements disposed on a cutting tool, for example, to better match the modeled trajectory of the cutting elements with a modeled trajectory of the cutting tool on which they are disposed and to more accurately predict cutting element behavior during operation. By modeling the trajectory of the cutting elements (separately from the cutting tool on which they are disposed), multiple types of motions (e.g., vibrations, rotations along multiple axes, etc.) may be accounted for in determining and designing suitable downhole equipment.

In some embodiments, a method may be provided to simulate or model a cutting tool drilling an earth formation that includes incrementally rotating the cutting tool at a time interval, determining a true trajectory of a plurality of cutting elements disposed on the cutting tool during drilling, and determining a dynamic work of the cutting elements based on the true trajectory and forces acting on the cutting elements at each interval of time. The simulation of the cutting tool drilling an earth formation may include modeling movement of the cutting tool having up to six degrees of freedom, where a degree of freedom refers to a type of movement. For example, embodiments disclosed herein may include simulating or predicting movement of a BHA and/or components thereof along the axes of an x-y-z coordinate system, including translations of the components along each of the axes and rotations of the components around each of the axes.

For example, in a BHA having a bent motor, the drilling assembly may rotate along two axes, intersecting one another at the bend angle. Such BHAs may be modeled according to embodiments of the present disclosure using more than two degrees of freedom, which may account for irregular movements, such as vibrational movements. In previous simulation methods, cutting elements were modeled based on an idealized helix configuration (accounting for only two degrees of freedom, translation and rotation along a single axis). FIGS. 3A and 3B illustrate a side and axial view, respectively, of an idealized helical trajectory of a cutter during an example drilling simulation. The helical trajectory illustrated in FIG. 3A may be determined by the radial distance of the cutting element from the central bit axis and the calculated rate of penetration (axial progression) of the bit during a drilling simulation. The axial view in FIG. 3B illustrates a circular trajectory of the cutter through the simulated formation. It assumes a steady, constant, forward progression of the cutter as the bit progresses. Such idealized trajectories may assume that the cutters remain at the same radial distance from the drilling axis/direction throughout the drilling simulation.

However, by modeling cutting element trajectories based on a more accurate reflection of the type of movement they undergo (e.g., using up to six degrees of freedom), the true trajectory of the cutting elements may be determined and analyzed, for example, for use in improved designing and predicting methods. FIGS. 3C and 3D illustrate a side and axial view, respectively, of an exemplary true trajectory of a cutting element during a drilling simulation. FIG. 3C illustrates the vibrations of the cutter as it advances into the formation, according to an embodiment. FIG. 3D illustrates the manifestation of a dual axis BHA system, e.g. a bent motor, in a cyclical true trajectory of a cutter, according to an embodiment. The simulated cutter trajectories shown in FIGS. 3C and 3D are based on the translational movement of the bit on which they are disposed (as well as rotational movements from rotating around the bit axis), rather than tracking in a constant radial distance from the direction of drilling. In other words, the true trajectory in FIGS. 3C and 3D may be calculated in relation to the bit axis, accounting for movement in six degrees of freedom, while the cutter trajectory shown in FIGS. 3A and 3B is calculated in relation to an idealized helical trajectory through the wellbore. FIG. 3D, when compared with FIG. 3B, shows how the true trajectory of a cutter may be substantially longer than an idealized circular trajectory. The longer trajectory indicates that a cutter is performing significantly more work per revolution of the bit than has been previously measured by drilling simulations.

For a given time interval, the true trajectory of a cutter may be in the direction of the BHA rotation, no motion, or opposite to the direction of BHA rotation. Certain cutters are designed to withstand conventional forces experienced when the cutter engages the formation on a leading surface, as determined using an idealized, helical trajectory. The true trajectory of a cutter, as disclosed herein, may provide a better understanding of unconventional forces experienced by cutters, such as those on non-leading surfaces, leading to improved design of cutting structures, drilling parameters, and BHAs to mitigate or tolerate unconventional forces.

According to some embodiments, a method of designing a BHA may include simulating drilling an earth formation using the BHA, determining one or more cutting elements subjected to cyclic loading, altering at least one input parameter selected from the group consisting of cutting tool parameters, drilling operating parameters and BHA parameters, and repeating simulating, determining and altering until an optimal cutting tool design parameters is reached.

FIGS. 4A-D depict a method for selecting or designing a BHA, according to an embodiment of the invention. One or more of the modules and elements shown in FIGS. 4A-D may be omitted, repeated, and/or substituted in various embodiments of the invention. Accordingly, embodiments of the present disclosure should not be considered limited to the specific arrangements of modules shown in FIGS. 4A-D.

Figure 4A:
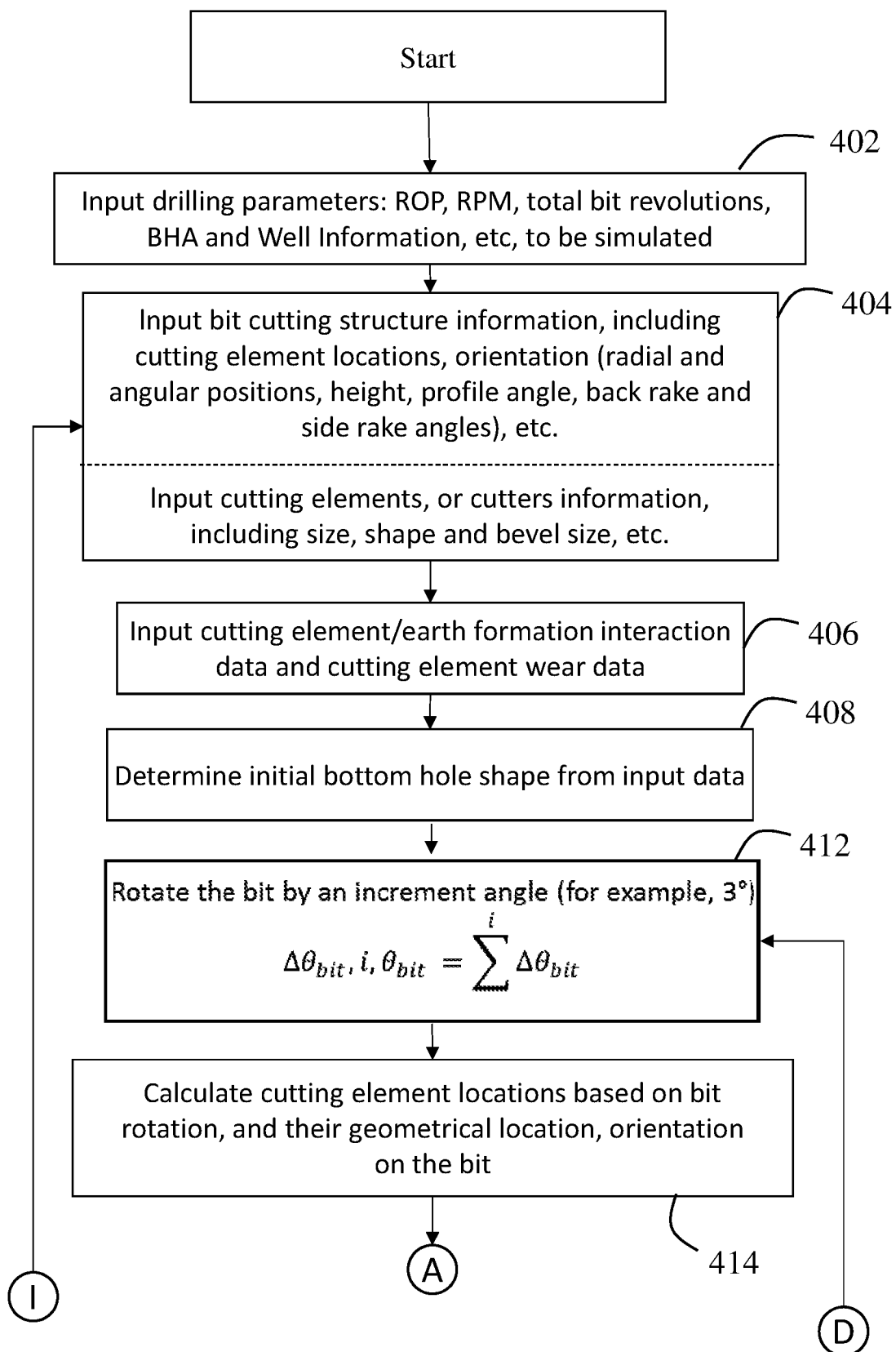
FIGS. 4A-D show a method in accordance with one or more embodiments of the present disclosure.

As shown in FIG. 4A, the method includes selecting or otherwise inputting parameters for a dynamic simulation. Parameters provided as input may include drilling parameters 402, bit design parameters 404, cutter/formation interaction data and cutter wear data 406, and bottom hole parameters for determining the initial bottom hole shape 408. Other input parameters may include, but are not limited to, other cutting tool parameters (e.g., drill bit parameters for a baseline bit), BHA parameters (e.g., from a bent motor BHA), actual well survey information, and other drilling operating parameters. The data and parameters provided as input for the simulation can be stored in an input library and retrieved as need during simulation calculations.

Drilling parameters 402 may include any parameters that can be used to characterize drilling. In the method shown, the drilling parameters 402 provided as input include the rate of penetration (ROP), the rotation speed of the drill bit (revolutions per minute, RPM), the total bit revolutions, BHA and well information.

Bit design parameters 404 may include any parameters that can be used to characterize a bit design. In the method shown, bit design parameters 404 provided as input include the cutter locations and orientations (e.g., radial and angular positions, heights, profile angles, bake rake angles, side rake angles, etc.) and the cutter sizes (e.g., diameter), shapes (i.e., geometry) and bevel size. Additional bit design parameters 404 may include the bit profile, bit diameter, number of blades on bit, blade geometries, blade locations, junk slot areas, bit axial offset (from the axis of rotation), cutter material make-up (e.g., tungsten carbide substrate with hardfacing overlay of selected thickness), etc. Those skilled in the art will appreciate that cutter geometries and the bit geometry can be meshed, converted to coordinates and provided as numerical input. Methods for obtaining bit design parameters 404 for use in a simulation may include the use of 3-dimensional CAD solid or surface models for a bit to facilitate geometric input.

Cutter/formation interaction data 406 includes data obtained from experimental tests or numerically simulations of experimental tests which characterize the actual interactions between selected cutters and selected earth formations, as previously described in detail above. Wear data 406 may be data generated using any wear model known in the art or may be data obtained from cutter/formation interaction tests that included an observation and recording of the wear of the cutters during the test. A wear model may comprise a mathematical model that can be used to calculate an amount of wear on the cutter surface based on forces on the cutter during drilling or experimental data which characterizes wear on a given cutter as it cuts through the selected earth formation. U.S. Pat. No. 6,619,411 issued to Singh et al. discloses methods for modeling wear of roller cone drill bits. This patent is assigned to the present assignee and is incorporated by reference in its entirety. Wear modeling for fixed cutter bits (e.g., PDC bits) will be described in a later section. Other patents related wear simulation include U.S. Pat. Nos. 5,042,596, 5,010,789, 5,131,478, and 4,815,342. The disclosures of these patents are incorporated by reference.

Bottom hole parameters used to determine the bottom hole shape at 408 may include any information or data that can be used to characterize the initial geometry of the bottom hole surface of the well bore. The initial bottom hole geometry may be considered as a planar surface, but this is not a limitation on the invention. Those skilled in the art will appreciate that the geometry of the bottom hole surface can be meshed, represented by a set of spatial coordinates, and provided as input. In one implementation, a visual representation of the bottom hole surface is generated using a coordinate mesh size of 1 millimeter.

Once the input data (402, 404, 406) is entered or otherwise made available and the bottom hole shape determined (at 408), the steps in a main dynamic simulation loop can be executed. A dynamic simulation may account for multiple nodes, each having six degrees of freedom (e.g., multiple directions of rotation and translation).

Within the dynamic simulation, drilling is simulated by "rotating" the bit (numerically) by an incremental amount, $\Delta\theta_{bit,i}$, 412. The rotated position of the bit at any time can be expressed as $$\theta_{bit} = \Sigma^i \Delta\theta_{bit,i}$$

412. $\Delta\theta_{bit,i}$ may be set equal to 3 degrees, for example. In other implementations, $\Delta\theta_{bit,i}$ may be a function of time or may be calculated for each given time step. The new location of each of the cutters is then calculated, 414, based on the known incremental rotation of the bit, $\Delta\theta_{bit,i}$, and the known previous location of each of the cutters on the bit. At this step, 414, the new cutter locations only reflect the change in the cutter locations based on the incremental rotation of the bit. The newly rotated location of the cutters can be determined by geometric calculations known in the art.

Figure 4B:
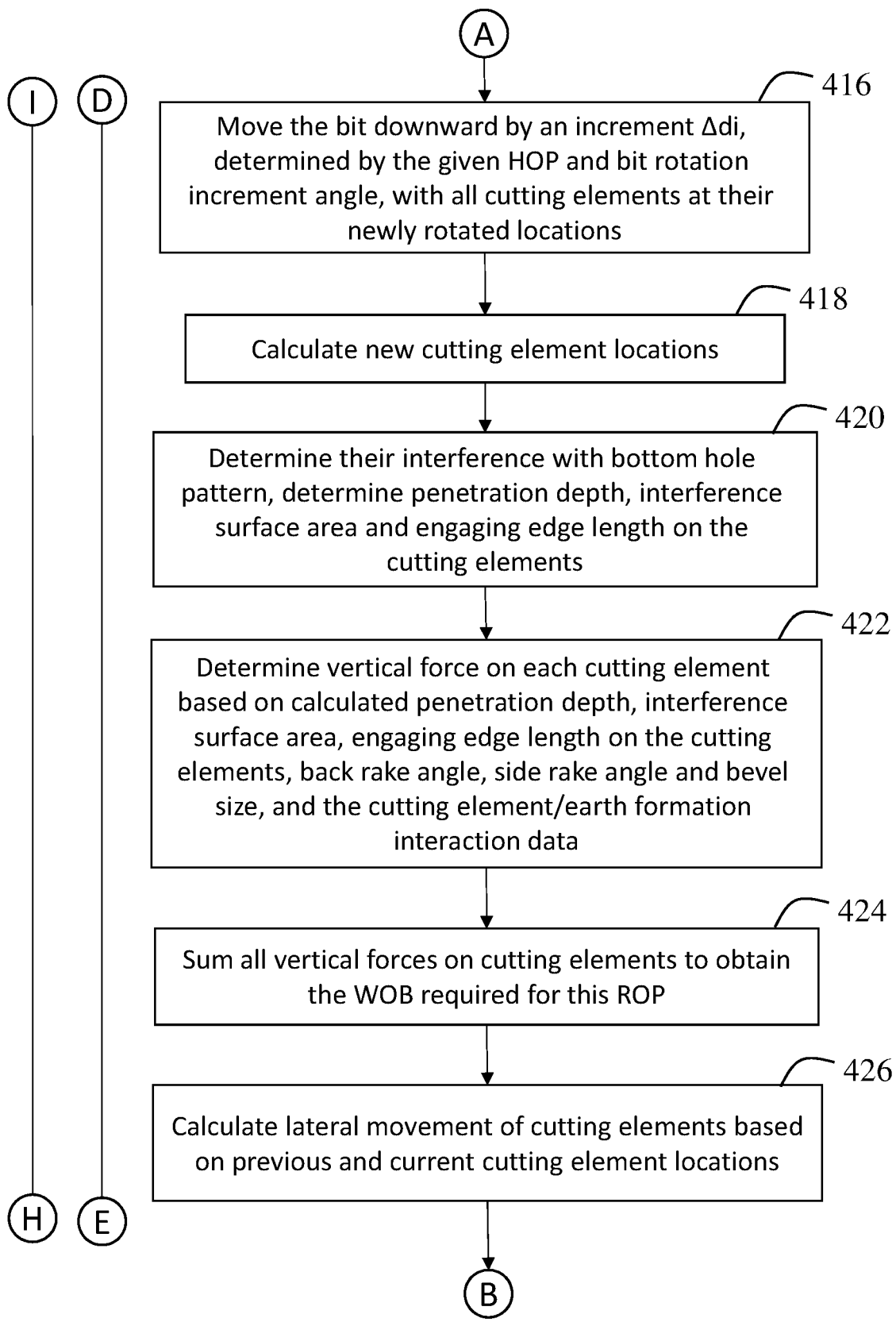

As shown at the top of FIG. 4B, the axial displacement of the bit, $\Delta d_{bit,i}$, during the incremental rotation is then determined, 416. In this implementation the rate of penetration (ROP) was provided as input data (at 402), therefore axial displacement of the bit is calculated based on the given ROP and the known incremental rotation angle of the bit. The axial displacement can be determined by geometric calculations known in the art. For example, if ROP is given in ft/hr and rotation speed of the bit is given in revolutions per minute (RPM), the axial displacement, $\Delta d_{bit,i}$, of the bit resulting for the incremental rotation, $\Delta\theta_{bit,i}$, may be determined using an equation such as:

$$\Delta d_{bit,i} = (ROP_i / RPM_i) \cdot (\Delta\theta_{bit,i}) / 60.$$

Once the axial displacement of the bit, $\Delta d_{bit,i}$, is determined, the bit is "moved" axially downward (numerically) by the incremental distance, $\Delta d_{bit,i}$, 416 (with the cutters at their newly rotated locations calculated at 414). Then the new location of each of the cutters after the axial displacement is calculated 418. The calculated location of the cutters now reflects the incremental rotation and axial displacement of the bit during the "increment of drilling". Then each cutter interference with the bottomhole is determined, 420. Determining cutter interaction with the bottomhole includes calculating the depth of cut, the interference surface area, and the contact edge length for each cutter contacting the formation during the increment of drilling by the bit. These cutter/formation interaction parameters can be calculated using geometrical calculations known in the art.

Once the correct cutter/formation interaction parameters are determined, the axial force on each cutter (in the Z direction with respect to a bit coordinate system) during increment drilling step, i, is determined, 422. The force on each cutter is determined from the cutter/formation interaction data based on the calculated values for the cutter/formation interaction parameters and cutter and formation information.

The normal force, cutting force, and side force on each cutter may be determined from cutter/formation interaction data based on the known cutter information (cutter type, size, shape, bevel size, etc.), the selected formation type, the calculated interference parameters (i.e., interference surface area, depth of cut, contact edge length) and the cutter orientation parameters (i.e., back rake angle, side rake angle, etc.). For example, the forces may be determined by accessing cutter/formation interaction data for a cutter and formation pair similar to the cutter and earth formation interacting during drilling. Then the values calculated for the interaction parameters (depth of cut, interference surface area, contact edge length, back rack, side rake, and bevel size) during drilling may be used to look up the forces required on the cutter to cut through formation in the cutter/formation interaction data. If values for the interaction parameters do not match values contained in the cutter/formation interaction data, records containing the most similar parameters may be used and values for those most similar records may be used to interpolate the force required on the cutting element during drilling.

In cases during drilling wherein the cutting element makes less than full contact with the earth formation due to grooves in the formation surface made by previous contact with cutters, an equivalent depth of cut and an equivalent contact edge length can be calculated to correspond to the interference surface area and used to look up the force required on the cutting element during drilling.

Once the forces (e.g., $F_N$, $F_{cut}$, $F_{side}$) on each of the cutters during the incremental drilling step are determined, 422, these forces may be resolved into bit coordinate system, $O_{ZR\theta}$, (axial (Z), radial (R), and circumferential $\theta$). Then, all of the forces on the cutters in the axial direction may be summed to obtain a total axial force $F_Z$ on the bit. The axial force required on the bit during the incremental drilling step is taken as the weight on bit (WOB) required to achieve the given ROP, 424.

Figure 4C:
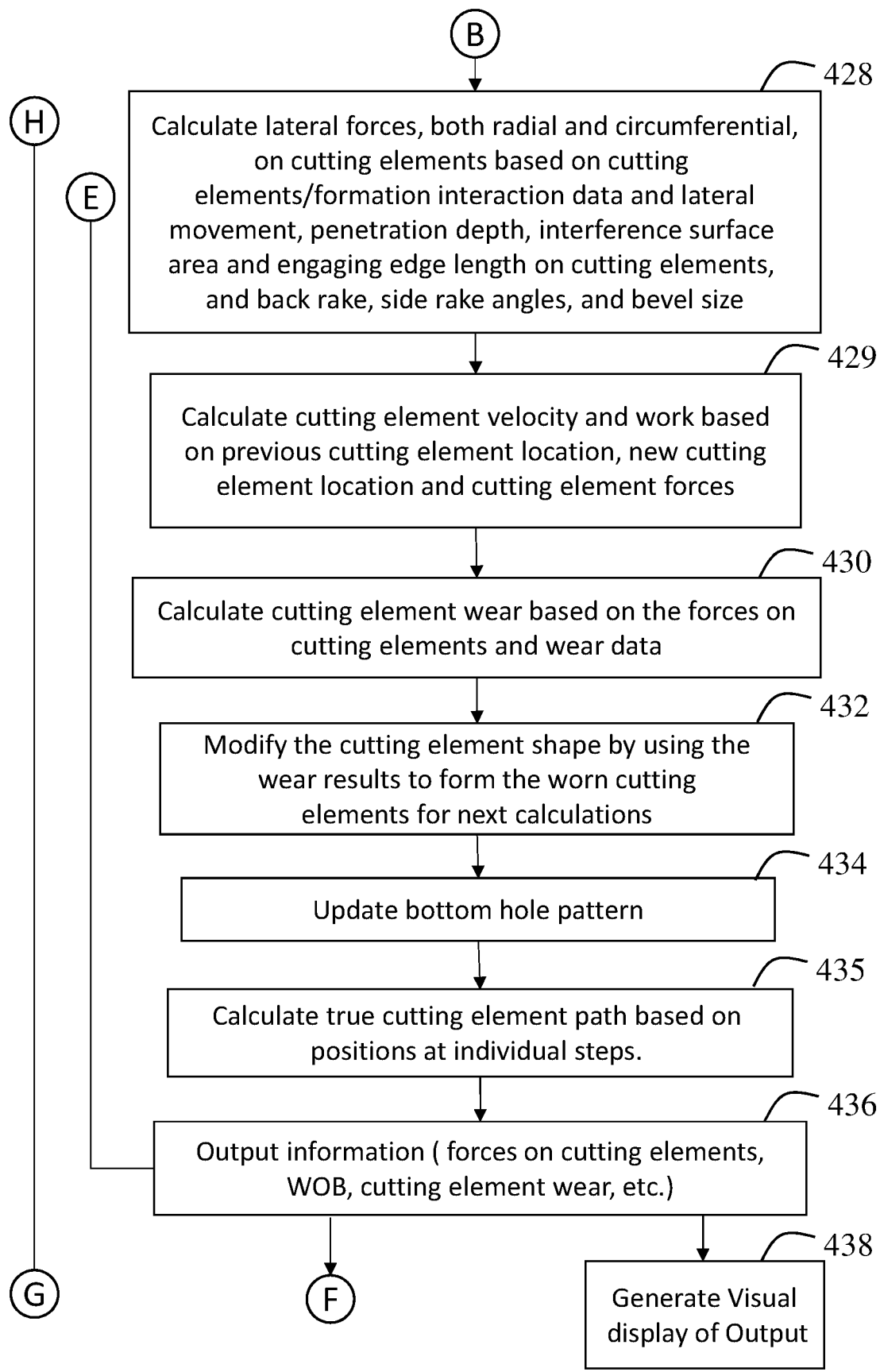
Figure 5:
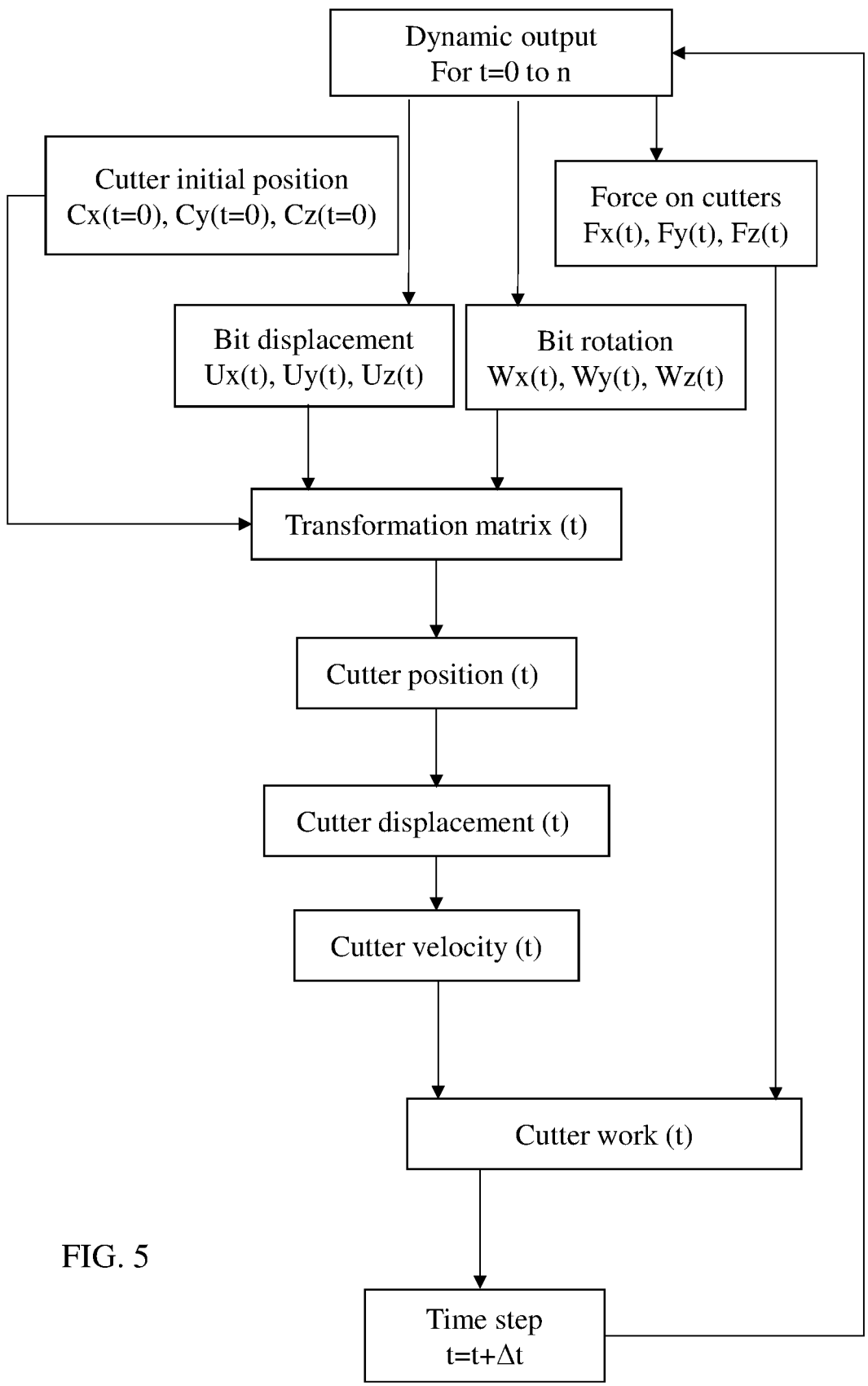
FIG. 5 shows a method in accordance with one or more embodiments of the present disclosure.

The displacement of each of the cutters is calculated based on the previous cutter location, $p_{j,i-1}$, and the current cutter location, $p_{j,i}$, 426. As shown at the top of FIG. 4C, the lateral forces, both radial and circumferential, on each cutter are then determined from cutter/formation interaction data based on the cutter lateral movement, penetration depth, interference surface area, contact edge length, and other bit design parameters (e.g., back rake angle, side rake angle, and bevel size of cutter), 428. The cutter velocity and work on each of the cutters may be calculated based on previous cutter location, $p_{j,i-1}$, new cutter location, $p_{j,i}$, and forces acting on the cutters, 429, such as described below with reference to FIG. 5. Cutter wear may also be calculated for each cutter based on the forces on each cutter, the interaction parameters, and the wear data for each cutter, 430. The cutter shape is modified using the wear results to form a worn cutter for subsequent calculations, 432.

Finally, the bottom hole pattern is updated, 434. The bottom hole pattern can be updated by removing the formation in the path of interference between the bottom hole pattern resulting from the previous incremental drilling step and the path traveled by each of the cutters during the current incremental drilling step.

Output information, such as forces on cutters, weight on bit, and cutter wear, may be provided as output information, at 436. The output information may include any information or data which characterizes aspects of the performance of the selected drill bit drilling the specified earth formations. For example, output information can include forces acting on the individual cutters during drilling, scraping movement/distance of individual cutters on hole bottom and on the hole wall, total forces acting on the bit during drilling, and the weight on bit to achieve the selected rate of penetration for the selected bit. Other simulation results may include other drilling performance parameters, such as downhole assembly lateral, axial or torsional vibrations, bit displacement, bit rotation, and other forces acting on the downhole assembly. From the simulation results, additional performance parameters may be determined as output information, including dynamic work and cyclic loading on the cutting elements.

As shown in FIG. 4C, output information may be used to generate a visual display of the results of the drilling simulation, at 438. The visual display 438 can include a graphical representation of the well bore being drilled through earth formations. The visual display 438 can also include a visual depiction of the earth formation being drilled with cut sections of formation calculated as removed from the bottom hole during drilling being visually "removed" on a display screen. The visual representation may also include graphical displays, such as a graphical display of the forces on the individual cutters, on the blades of the bit, and on the drill bit during the simulated drilling, the dynamic work values of one or more cutters, a dynamic work profile (described below) and the cyclic loading on individual cutters. The means used for visually displaying aspects of the drilling performance is a matter of choice for the system designer, and is not a limitation on the invention.

Figure 4D:
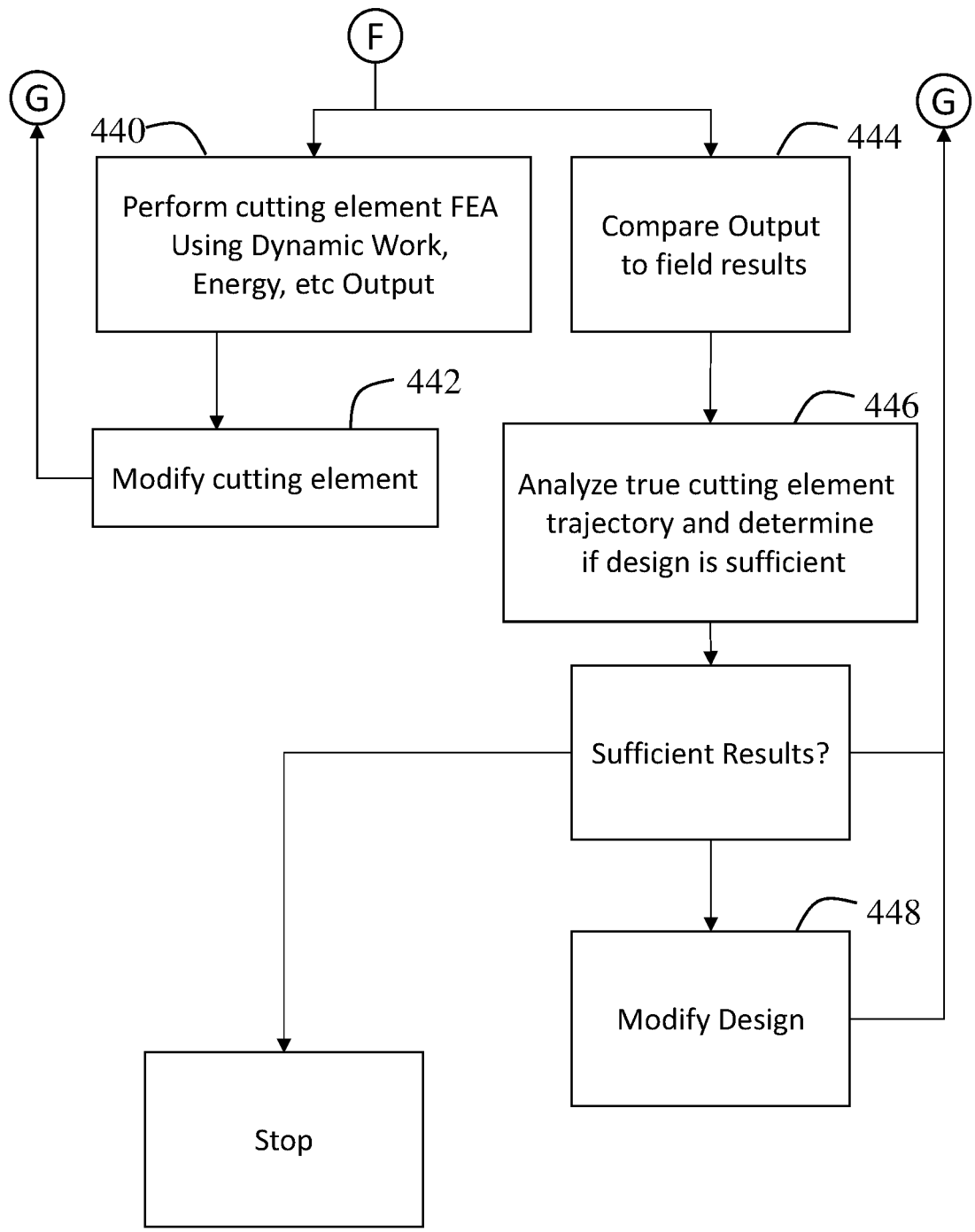

As shown in FIG. 4D, output information may be used to analyze and modify cutter design. For example, output information related to the cutters, such as cyclic loading on individual cutters, dynamic work by the cutters, and other performance parameters may be used as conditions for FEA (finite element analysis), 440. The FEA may be conducted for various types of cutting elements (including cutting elements made of different materials and/or having different geometries) to determine which type of cutting element best performs under the conditions outputted from the dynamic simulation. A modified cutter design, 442, may be selected based on the FEA results, which may then be used as inputs for the cutting element parameters, inputted at 404 (shown in FIG. 4A) in another dynamic simulation loop. In another embodiment, output information, e.g. cyclic loading and dynamic work profiles, may be used to design lab experiments or qualification tests. Such testing and experimentation may expose potential cutters to cyclic loads and dynamic work such as that predicted by the simulation, in order to evaluate a cutter's suitability for the simulated application, BHA and/or bit design.

The performance parameters determined from the simulation results and from any cutting element FEA performed may be compared with results gathered from the field (e.g., results from a drilling operation or from a test drill run, where the BHA and wellbore characteristics are the same or substantially the same as the parameters inputted into the simulation). When the performance parameters do not match or substantially correspond with those measured or seen in the field, it may be an indication that the input parameters did not substantially match or accurately reflect the conditions of the drilling operation being simulated. In such instances, the input parameters may adjusted, and the simulation may be rerun. When the performance parameters match or substantially correspond with those measured or seen in the field, the failures or less than desired performance of any of the components in the BHA may be analyzed to determine a cause. Once a cause of any failures or less than desired performance is determined, a new design of one or more components of the BHA may be proposed to improve performance of the BHA. In some embodiments, one or more altered input parameters reflecting the new design may be inputted to simulate the new design.

For example, as shown in FIG. 4D, output information from 436 may be compared to field results (from drilling operations having similar parameters as those inputted into the dynamic simulation), 444. Based on the comparison between actual field results and the output information from 436, the true trajectory of the cutters may be analyzed, 446, to determine if the BHA and/or cutting tool design is sufficient for achieving a desired performance. If the performance of the simulated BHA is not sufficient, the design of the BHA and/or cutting tool may be modified, 448, which may then be used as inputs for the cutting tool parameters, inputted at 404 in FIG. 4A, (or as inputs for the BHA or drilling operation parameters, inputted at 402 in FIG. 4A), in another dynamic simulation loop.

As should be understood by one of ordinary skill in the art, the steps within the main dynamic simulation loop may be repeated as desired by applying a subsequent incremental rotation to the bit and repeating the calculations in the main simulation loop to obtain an updated cutter geometry (if wear is modeled) and an updated bottom hole geometry for the new incremental drilling step. Repeating the simulation loop as described above will result in the modeling of the performance of the selected fixed cutter drill bit drilling the selected earth formations and continuous updates of the bottom hole pattern drilled. In this way, the method as described can be used to simulate actual drilling of the bit in earth formations.

An ending condition, such as the total depth to be drilled, can be given as a termination command for the simulation, the incremental rotation and displacement of the bit with subsequent calculations in the simulation loop will be repeated until the selected total depth drilled, e.g., $$D = \Sigma^i \Delta d_{bit,i}$$

is reached. Alternatively, the drilling simulation can be stopped at any time using any other suitable termination indicator, such as a selected input from a user.

According to embodiments of the present disclosure, a method for designing a BHA may include preparing a new design of a BHA. The new design may be based on modifications from a baseline design. For example, modifications may include changing various cutting tool parameters, such as changing a blade cutting profile shape, changing back rake angles of one or more cutting elements, changing the amount and/or location of cutting elements used on the cutting tool, changing the number and/or size of cutting tool blades, and/or changing the type of cutting element used. The BHA parameters may be input into a dynamic simulation, which may account for multiple nodes—each having six degrees of movement—to test performance of the new design. The simulation results may include various drilling performance parameters, such as downhole assembly lateral, axial or torsional vibrations, bit displacement, bit rotation, and forces acting on the downhole assembly, including forces acting on cutting elements disposed on a downhole cutting tool. From the simulation results, additional performance parameters may be determined, including dynamic work and cyclic loading on the cutting elements, as described below.

When cyclic loading and other performance parameters are determined for cutting elements, FEA (finite element analysis) may be conducted for various types of cutting elements (including cutting elements made of different materials and/or having different geometries) to determine which type of cutting element best withstands the cyclic loading and other forces encountered from the simulation input parameters. If known cutting elements analyzed through FEA have less than desired performance, a new cutting element may be designed (e.g., altering material composition, cutting face geometry, size, shape, or other cutting element parameter) to withstand the determined cyclic loading and dynamic work from the simulated drilling operation. For example, a cutting element may be designed to have increased fatigue strength, increased impact resistance, increased toughness, and/or increased wear resistance, or a known cutting element having one or more improved properties (e.g., fatigue strength, toughness, wear resistance, impact resistance) may be selected. The cutting element parameters may be altered to reflect the changed properties, and the altered cutting element parameters may be input to the dynamic simulation. When cutting element performance under FEA is improved to the level desired or sufficient for use in the BHA (e.g., capable of withstanding the determined cyclic loading, dynamic work, or other performance parameters), the cutting element design may be used in a new design of the BHA.

Other simulation results and additional performance parameters, such as calculated dynamic work or dynamic energy, bit vibration, and forces acting on cutting elements may be compared with the baseline design to determine if a desired level of performance is achieved with the new design. If there is sufficient improvement, the new design may be used. If there is insufficient improvement (i.e., less than desired), one or more input parameters, such as at least one drilling performance parameter, drilling operating parameter and/or BHA parameter, may be adjusted, and the dynamic simulation may be rerun.

For example, in embodiments where the simulated BHA is a bent motor BHA, at least one BHA parameter may be altered, including but not limited to a bend angle, a motor diameter, a stabilizer size, type and placement and/or the number of stabilizers used in the BHA. In embodiments including a bent motor BHA, the dual axes from the bend angle may result in more complicated movements of the cutting tool, and in some cases, may result in increased vibration or inconsistent movements of the cutting tool. At least one parameter of the bent motor assembly and/or at least one stabilizer parameter may be altered, for example, to improve the overall stability of the bent motor BHA, reduce cyclic loading, and/or reduce uneven accumulation of forces on one or more regions of the cutting tool.

In one or more embodiments, a system for simulating or modeling a BHA and/or a drilling operation using a selected BHA may include a computing device having one or more computing processors, one or more storage devices (e.g., a hard disk, an optical drive such as a compact disk (CD) drive or digital versatile disk (DVD) drive, a flash memory stick, etc.), memory (e.g., random access memory (RAM), cache memory, flash memory, etc.), and a graphical user interface (GUI). The computing processor(s) may be an integrated circuit for processing instructions. For example, the computing processor(s) may be one or more cores, or micro-cores of a processor. The storage device(s) (and/or any information stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The storage device(s) may be a device internal to the computing device. Alternatively, the storage device(s) may be an external storage device operatively connected to the computing device. Additionally, the computing device may include numerous other elements and functionalities.

The computing device may be communicatively coupled to a network (e.g., a local area network (LAN), a wide area network (WAN) such as the Internet, mobile network, or any other type of network) through wires, cables, fibers, optical connectors, a wireless connection, or a network interface connection (not shown).

The system may also include one or more input device(s), such as a touchscreen, keyboard, mouse, microphone, touchpad, electronic pen, or any other type of input device. Further, the system may include one or more output device(s), such as a screen (e.g., a liquid crystal display (LCD), a plasma display, touchscreen, cathode ray tube (CRT) monitor, projector, 2D display, 3D display, or other display device), a printer, external storage, or any other output device. One or more of the output device(s) may be the same or different from the input device(s). The input and output device(s) may be locally or remotely (e.g., via the network) connected to the computer processor(s), memory, storage device(s), and GUI. Many different types of systems exist, and the aforementioned input and output device(s) may take other forms.

Further, one or more elements of the aforementioned system may be located at a remote location and connected to the other elements over a network. Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

The GUI may be operated by a user (e.g., an engineer, a designer, an operator, an employee, or any other party) using one or more input devices, and the GUI may be visualized one or more output devices coupled to the computing device. The GUI may include one or more buttons (e.g., radio buttons), data fields (e.g., input fields), banners, menus (e.g., user input menus), boxes (e.g., input or output text boxes), tables (e.g., data summary tables), sections (e.g., informational sections or sections capable of minimizing/maximizing), screens (e.g., welcome screen or home screen), and/or user selection menus (e.g., drop down menus). In addition, the GUI may include one or more separate interfaces and may be usable in a web browser or as a standalone application.

The output device(s) may be communicatively coupled to the computing device, or the output device(s) may be a component of the computing device.

The computing device may be capable of simulating a BHA. The BHA to be simulated may be selected, by a user, from a pre-existing library of BHAs or a BHA may be customized, by the user, using the GUI of the computing device. The user may customize the BHA by inputting or selecting a variety of drilling components. In one or more embodiments, the user may select a number of axial vibration tools and/or a number of shock subs. Further, the user may also customize a number of parameters associated with each of the selected axial vibration tools or shock subs. For example, the user may modify a distance between a selected axial vibration tool or shock sub with respect to the drill bit of the BHA. Further, the user may also select a distance between the selected vibration tool and shock sub.

Additionally, the simulation may be customized by inputting or selecting a variety of well bore parameters and drilling operating parameters. To modify the BHA and/or customize the BHA or simulation, the user may access storage devices(s) using any input means known in the art (e.g., input device(s)). The storage device(s) may be capable of having data stored thereon and may include, for example, rock profiles, BHA parameters and components, and/or drilling operating parameter, among many others. Once the user customizes the BHA and other simulation parameters, the computing device may execute instructions on the computing processor(s) to perform a simulation based on the customized BHA and the parameters selected or input by the user.

In addition, the BHA may be selected for simulation or modified based on data input or selected by the user. The user may also modify a BHA based on particular drilling operating parameters, wellbore parameters, or any other conditions known in the art or disclosed herein. For example, a user may determine a preferred WOB or ROP and may modify the BHA accordingly taking into account the preferred WOB and/or ROP, among others using the GUI.

Once the user customizes the BHA and other simulation parameters, the computing device may execute instructions on the computing processor(s) to perform a simulation based on the customized BHA and the parameters selected or input by the user. The drilling simulation may be performed using one or more of the methods set forth above. Executing the simulation generates a set of performance data. In some cases, the set of performance data generated may depend on the data selected or input by the user and may include instructions to generate specific performance data, as mentioned above. In other embodiments, the executed simulation may generate one or more performance factors including, but not limited to, rate of penetration (ROP), surface weight on bit (SWOB), downhole weight on bit (DWOB), axial velocity, axial friction force, axial acceleration, lateral acceleration, bit rotations per minute (RPM), among many others.

From performance parameters generated by the simulation, one or more additional performance parameters may be determined, for example, by user calculations or by additional instructions given to the simulation program. For example, referring to FIG. 5, a dynamic simulation may generate dynamic outputs including bit (or other cutting tool) displacement, bit (or other cutting tool) rotation and the force acting on the cutting elements. Bit displacement and bit rotation may be outputted based on a x, y, z coordinate system as a function of time (e.g., bit displacement may be outputted as $Ux(t)$, $Uy(t)$, $Uz(t)$) and bit rotation may be outputted as $Wx(t)$, $Wy(t)$, $Wz(t)$), where the amount of displacement and rotation may be measured at each interval or step of time (t) from the incremental simulation of drilling at the time interval. Likewise, the force acting on the cutting elements may be outputted as a function of time (e.g., $Fx(t)$, $Fy(t)$, $Fz(t)$), where the amount of force on each cutting element being simulated may be measured at each interval or step of time (t) during the incremental simulation of drilling. Using an initial position of the bit or other cutting tool, where the initial position of cutting elements is zero (e.g., $Cx(t=0)$, $Cy(t=0)$, $Cz(t=0)$), the bit displacement and bit rotation, a transformation matrix may be calculated, which may provide a position of each cutting element at a time step (t) (i.e., at an interval of time in the incremental simulation of the cutting tool). The position of each cutting element at each time step may be complied, plotted or otherwise displayed to show the true trajectory of the cutting elements during the simulation. From the change in position of each cutting element at the time step (t), cutting element displacement and cutting element velocity may be determined. Using the force output and either the cutting element displacement or the cutting element velocity, a dynamic work and rate of work on the cutting elements may be calculated using standard equations. The process may then be repeated for the next time step ($t=t+\Delta t$). Further, other characteristics may be calculated on the true trajectory of the cutting elements, such as acceleration of the cutting elements and energy of the cutting elements.

Once presented with the performance factors, a user may modify at least one axial vibration tool parameter, shock sub parameter, cutting tool parameter, or other BHA parameter, wellbore parameter, or drilling operating parameter. Modification may involve selecting a parameter from pre-existing values or inputting the parameter to obtain a modified value. The pre-existing values may depend on manufacturing capabilities or geometries of the components of the BHA, axial vibration tool, or shock sub.

After modification, a second simulation may be executed by the computing device. The second simulation may include the modified parameter to be simulated. The simulation may be executed by the computing device using the processor(s) to generate a second set of performance data. The drilling simulation may be performed using one or more of the methods set forth above. Once generated, the initial set of data along with the second set of data may be presented using GUI and output device(s). The sets of data may be presented to the user for comparison and may be presented separately or combined. The sets of data may be presented or visualized using any tools known in the art, such as, for example, plots, graphs, charts, and logs.

Additionally, a second simulation may occur simultaneously with the first simulation. For example, a number of BHAs, axial vibration tools, and/or shocks subs may be selected to operate in particular wellbore and drilling operating conditions. A number of simulations may be run and then resulting outputs (e.g., performance factors) may be compared. Furthermore, in some embodiments, the simulation and thus, the comparison, may be done in real-time. More specifically, a number of simulations may be run for a given drilling scenario and performance observed as the simulation progresses. Furthermore, data may be acquired and/or measured in the field. The results from one or more simulations may then be used to compare to one or more field acquired/measured parameters.

After simulation, the ROP, SWOB, DWOB, or other performance factors may be visualized by the GUI on the output device(s). In one embodiment, the visual outputs may include tabular data of one or more performance parameters. Additionally, the outputs may be in the form of graphs and may be represented as percentages or ratios. For example, cutting element position/displacement may be graphically displayed as the true trajectory of the cutting elements. Other performance parameters, such as dynamic work and cyclic loading on cutting elements may be graphically displayed, which may show regions of a cutting tool experiencing increased amounts of forces.

Figure 6:
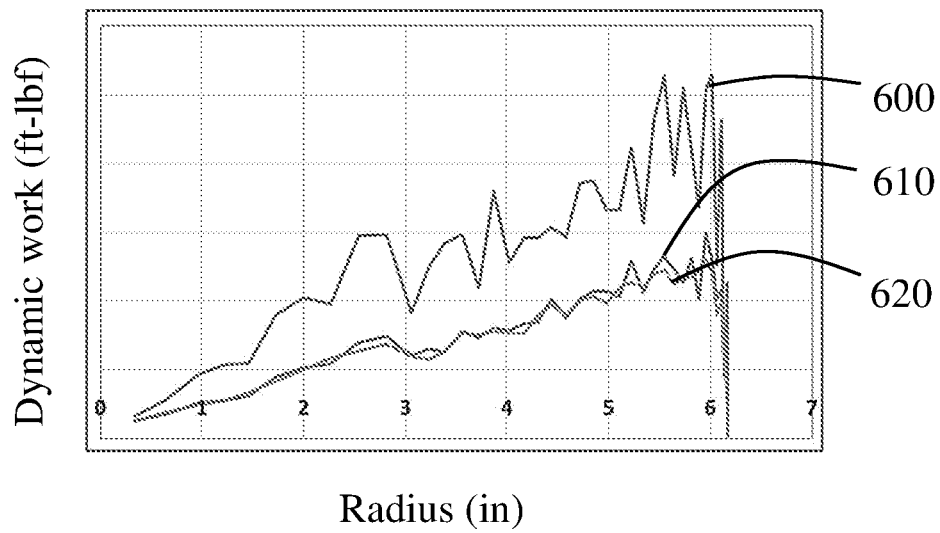
FIG. 6 shows a graph of performance parameters according to embodiments of the present disclosure.

For example, according to some embodiments of the present disclosure, one or more BHA (e.g., a bent motor BHA and/or a straight hole motor BHA) may be simulated in a drilling operation. From performance parameters generated by the simulation, one or more additional performance parameters may be determined, for example, by user calculations or by additional instructions given to the simulation program. In some embodiments, the dynamic work of cutting elements in the BHA may be determined, such as described above. The dynamic work may be graphically displayed comparing the dynamic work to a corresponding location on the cutting tool. For example, FIG. 6 shows a dynamic work profile, or plot, displaying the dynamic work of cutting elements on a drill bit cutting tool from three different BHAs: bent motor BHA 600, straight hole BHA 610, and RSS (Rotary Steerable System) BHA 620 as a function of radius, or distance from the bit axis. That is, the dynamic work is plotted with the location of the cutting elements on the bit, where 0 inches is at the axial centerline of the bit, and the gage (or outer diameter of the bit) is between 6 and 7 inches from the bit centerline. As shown, the cutting elements proximate the gage region of the bit experience greater dynamic work than cutting elements close to the centerline.

Based on the graphical display of the dynamic work profile (or in other embodiments, based on the numerical data of the dynamic work of cutting elements on a cutting tool), at least one cutting tool parameter may be altered to improve performance in the location of the cutting tool having the greatest dynamic work. For example, cutting element parameters may be altered to provide cutting elements experiencing the greatest amount of dynamic work with increased fatigue strength, impact resistance, or increased toughness, or cutting tool parameters (e.g., blade size, shape or material) may be altered to provide improved supporting properties or improved wear properties, or other BHA parameters may be altered to reduce dynamic work.

Figure 7:
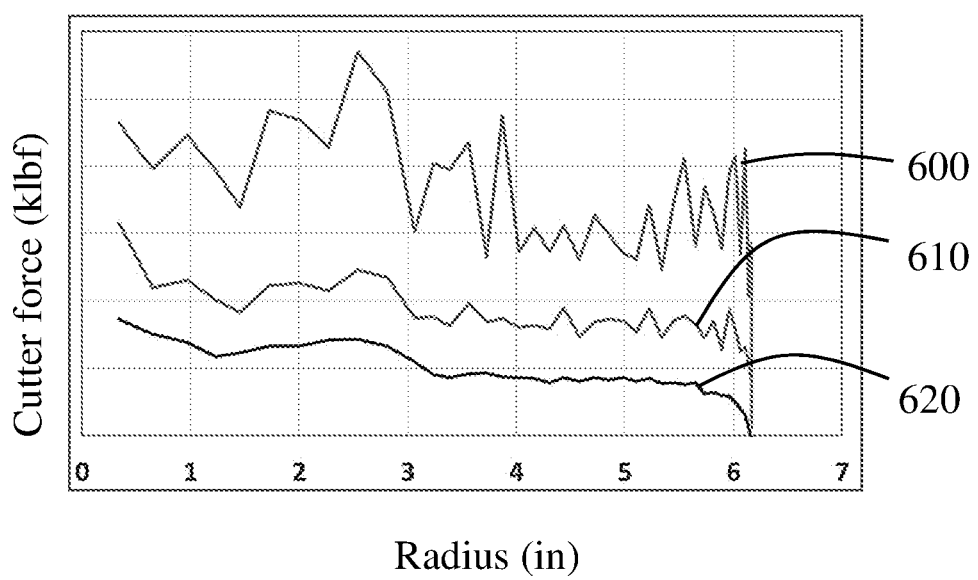
FIG. 7 shows a graph of performance parameters according to embodiments of the present disclosure.

Using the dynamic work of cutting elements to analyze and/or predict performance of a BHA, and optionally design BHAs, may more accurately reflect results of drilling operations, and thus may provide improved design alternatives, when compared with using the forces acting on the cutting elements to analyze and predict performance of a BHA. FIG. 7 illustrates a plot of the force acting on drill bit cutting elements from the three BHAs: bent motor BHAs 600, straight hole BHA 610, and RSS BHA 620, as referred to in FIG. 6. The force is plotted with the location of the cutting elements on the bit, where 0 in is at the axial centerline of the bit, and between 6 and 7 inches from the bit centerline is the gage, or outer diameter of the bit. A user reviewing performance of the BHAs 600, 610, 620 based on the force outputs shown in FIG. 7 may interpret cutting elements closer to the bit centerline as needing higher strength or other improved property for withstanding the relatively higher forces. However, if the user were to review the performance of the BHAs based on the dynamic work on the cutting elements (derived from the true trajectories of the cutting elements, as described above), the user may see that the cutting elements closer to the gage of the bit may need improved properties for withstanding the relatively higher work as compared to centerline cutting elements.

In an embodiment, performance parameters determined from results generated by a simulation include cyclic loading on one or more cutting elements, including, for example, an average amplitude, an average frequency and an average duration of the loading. The cyclic loading may be determined from the change in amount of dynamic work as the cutting element moves with the cutting tool on which it is disposed. Cyclic loading may be determined, for example, by user calculations or by additional instructions given to the simulation program.

Figure 8:
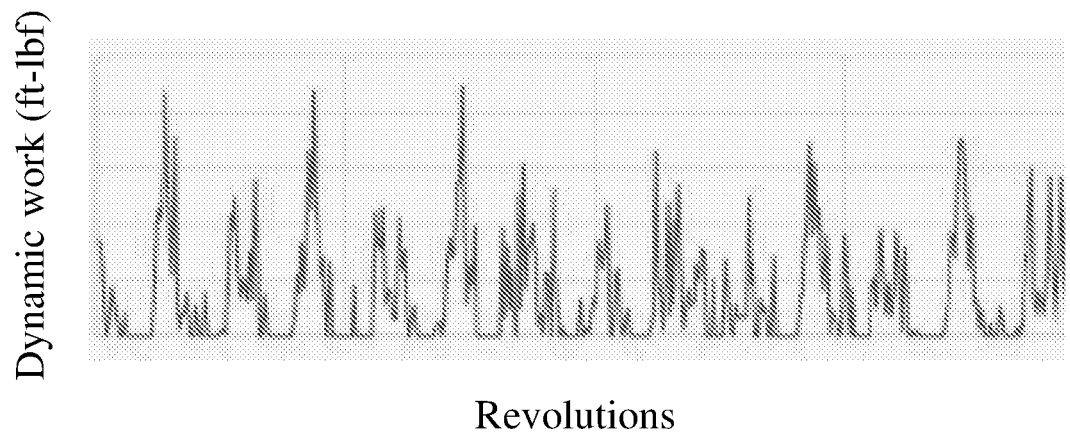
FIG. 8 shows a graph of performance parameters according to embodiments of the present disclosure.
Figure 9:
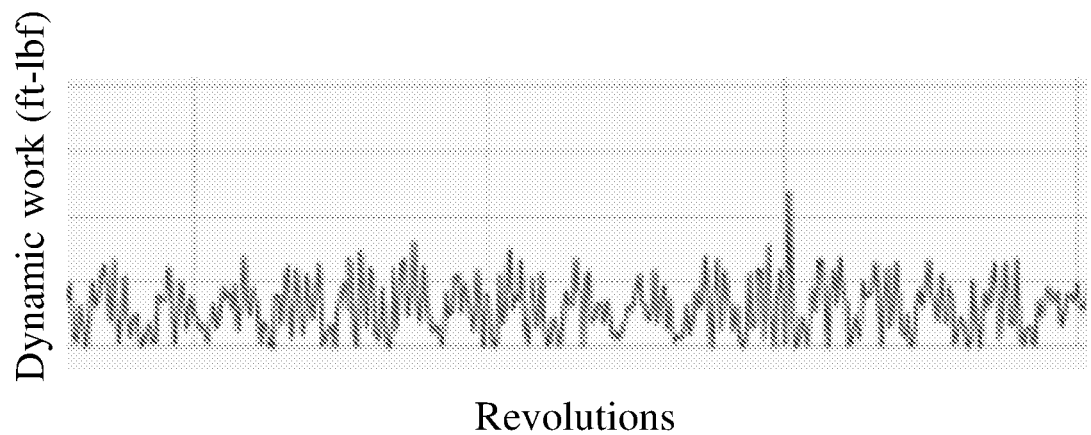
FIG. 9 shows a graph of performance parameters according to embodiments of the present disclosure.
Figure 10:
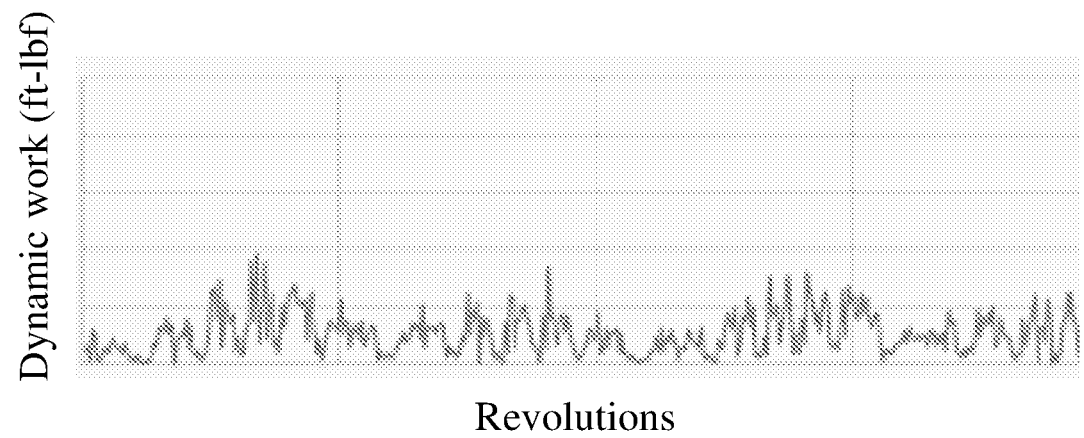
FIG. 10 shows a graph of performance parameters according to embodiments of the present disclosure.
Figure 11:
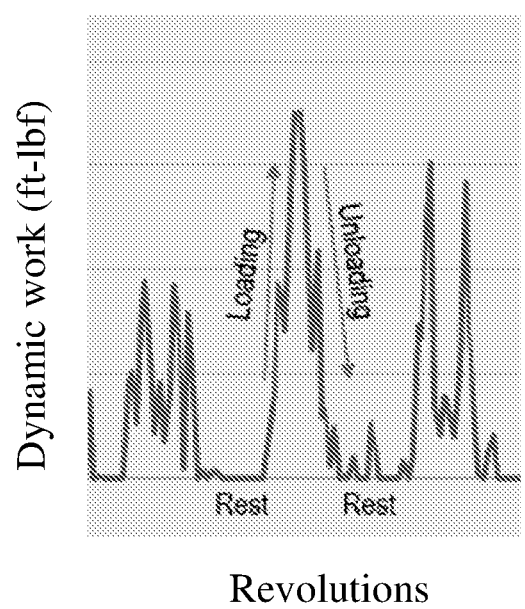
FIG. 11 shows a graph of performance parameters according to embodiments of the present disclosure.

For example, referring again to the dynamic work results shown in FIG. 6, the dynamic work of one of the cutting elements in the BHAs may be compared against the progress or revolutions of the cutting tool. In other words, the dynamic work of the cutting element may be determined at each incremental rotation of the cutting tool as the drilling operation is simulated. FIGS. 8-10 show graphical displays of the dynamic work for a cutting element located at 6 inches from the centerline on three separate BHAs. Particularly, the dynamic work of cutting elements located in the same position on drill bits in a bent motor BHA having a bend angle of 1.5° (FIG. 8), a bent motor BHA having a bend angle of 0° (FIG. 9), and a straight hole motor BHA (FIG. 10) is shown as the drill bits rotate during simulation. As shown, the dynamic work of each cutting element fluctuates as the bit rotates. The fluctuating dynamic work shows that there is cyclic loading on each of the exemplary cutting elements. FIG. 11 shows a larger view of a loading, unloading and rest cycle from the cyclic loading shown in FIG. 8. In an embodiment, the cyclic loading includes a time period where the cutter bears zero load, i.e. the cutter does zero work.

In some embodiments, the amplitudes, frequency and/or duration of the loading cycles may be averaged for analysis, or the maximum and/or the minimum amplitudes, frequency and/or duration of the loading cycles may be averaged for analysis. Based on one or more characteristics of the cyclic loading, cutting element parameters, cutting structure parameters and/or BHA parameters may be altered for a redesign simulation. In some embodiments, FEA may be conducted to analyze cutting element performance subjected to the cyclic loading (e.g., subjected to the average amplitude, average frequency and average duration of the dynamic work encountered by the cutting element). Cutting element capability to withstand the cyclic loading determined from simulation results may more accurately predict performance of the cutting element when compared with prior simulation methods that do not include determining cyclic loading. Furthermore, because prior simulation methods did not include determining the true trajectory of cutting elements and the dynamic work of the cutting elements, the cyclic loading experienced by cutting elements was not known or undersood.

By using simulation or modeling methods of the present disclosure, a BHA, including BHAs having complex movement or movement along multiple degrees of freedom, a cutting tool may be designed to have improved characteristics in regions predicted to be subjected to higher forces and greater cyclic loading (e.g., cyclic loading having greater frequency and/or greater amplitude of work).

For example, according to some embodiments, a BHA may include a cutting tool having a tool body and a plurality of cutting elements disposed thereon. A first cutting element may be disposed on the tool body in a first region subjected to a first cyclic loading profile in a simulation of the bottom hole assembly, and a second cutting element may be disposed on the tool body in a second region subjected to a second cyclic loading profile in a simulation of the bottom hole assembly, where the first cyclic loading profile has one or more of a greater average amplitude, a greater average frequency, and a greater average duration relative to the second cyclic loading profile, and where the first cutting element may have one or more of a greater fatigue strength and a greater impact strength than the second cutting element. For example, the cutting elements may include one or more impact resistant cutting elements disposed on the tool body in a region subjected to relatively high cyclic loading in a simulation of the BHA and one or more wear resistant cutting elements disposed on the tool body in a second region subjected to relatively low cyclic loading in a simulation of the BHA. An impact resistant cutting element may refer to any cutting element having one or more characteristics designed to withstand cyclic loading, including, for example, increased fatigue strength, increased toughness, or a working surface shape that may withstand certain impacts, such as a dome shaped working surface. A wear resistant cutting element may refer to any cutting element type having one or more characteristics designed to withstand wear. For example, in some embodiments, a cutting tool may have one or more impact resistant cutting elements in a first region and one or more wear resistant cutting elements in a second region of a cutting tool exposed to relatively less cyclic loading than the first region, where the impact resistant cutting elements have a greater fatigue strength than the wear resistant cutting elements.

In some embodiments, the cutting tool may be coupled to a drill string having a bent section, where the bent section may have an adjustable bend angle. In such embodiments, the bent motor BHA may produce opposing and multiple forces at various locations along the BHA. For example, a bent motor BHA may generally have three points of contact, at the drill bit (on a distal end of the BHA), at the bent section, and at a region of the drill string on the opposite side of the bent section from the drill bit, where the fulcrum is at the bend location. The contact of the bit may drive the directional capabilities of the BHA and may also put a large side load on the bit (e.g., in the shoulder region of the bit). A larger bend angle may create a higher side load on the bit. A larger diameter motor and a shorter bit to bend section may also create a higher side load on the bit. Uneven load on the bit, for example in a gage or shoulder region along the side of the bit, may lead to cyclic loading and an uneven dynamic work distribution, as described above.

Simulations and modeling methods disclosed herein may account for such complex and dynamic movements and forces in bent motor BHA. The increased accuracy in simulation and modeling may be used to design improved bent motor BHAs (as well as other BHA types). For example, in simulations showing increased amounts of dynamic work experienced in the gage region or a region proximate the gage region, such as the shoulder region, of a cutting tool, the cutting tool may be designed to have improved impact resistance in the region subjected to increased amounts of dynamic work, such as by providing impact resistant cutting elements in the region. In simulations showing lower amounts of dynamic work experienced in a region of a cutting tool proximate to the cutting tool's central axis, the cutting tool may be designed to have improved wear resistance in that region, such as by providing wear resistant cutting elements in the region. In some embodiments, one or more stabilizers may be positioned along the drill string of a BHA to reduce bit vibrations and cyclic loading. Other modifications to a BHA, such as those described above, may be made to reduce cyclic loading and uneven distribution of dynamic work.

While previous modeling efforts have included determining forces between a cutting element and formation being drilled or a relative velocity of a cutting element during drilling, it has not yet been known to track the trajectories of cutting elements in addition to a bit trajectory. By using simulations and modeling methods of the present disclosure, the inventors have found a significant difference in the actual "true" trajectory of cutting elements during drilling than what was previously thought to be the trajectory of cutting elements. For example, through the modeling and simulations of the present disclosure, it can be seen that the actual trajectory, or true trajectory, that cutting elements travel during drilling may subject the cutting elements to high rates of cyclic loading. Further, because the true trajectory of cutting elements may be longer than trajectories previously simulated (e.g., by using an idealized helical model), the dynamic work on the cutting elements may be more than previously thought.

Embodiments of the present disclosure, therefore, allow a BHA designer to compare and contrast performance characteristics of one or more BHAs under various wellbore conditions and drilling operation conditions. As such, engineers can then add, remove, or move components on the BHA to improve, modify, or remove deleterious effects. By allowing a designer to review the performance effects of any modifications, the overall performance of the BHA in a particular field operation may be improved.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure. Further, portions of the systems and methods may be implemented as software, hardware, firmware, or combinations thereof.

Visual outputs that may be used in accordance with the present disclosure, in addition to those shown and described herein, include any output shown or described in any of in U.S. Pat. Nos. 6,516,293, 6,873,947, 7,844,426, 7,139,689, 6,785,641, 8,401,831, and 7,464,013 as well as U.S. patent application Ser. Nos. 10/749,019, 10/852,574, 10/851,677, 10/888,358, and 10/888,446, all of which are incorporated by reference in their entirety.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

What is claimed is:

1. A method, comprising:
simulating a cutting tool drilling an earth formation, comprising incrementally rotating the cutting tool at a plurality of time intervals;
determining a trajectory of the cutting tool to model at least a portion of a section of a wellbore;
determining a true trajectory of a cutting element disposed on the cutting tool for a duration of the plurality of time intervals, wherein determining the true trajectory of the cutting element is conducted separately from determining the trajectory of the cutting tool; and
determining a dynamic work profile for the cutting element based on the true trajectory and a force acting on the cutting element at each time interval.

2. The method of claim 1, further comprising displaying the dynamic work profile in a graphical display.

3. The method of claim 1, further comprising:
determining a second dynamic work profile for a second cutting element disposed on the cutting tool; and
comparing the dynamic work profile to the second dynamic work profile.

4. The method of claim 3, further comprising:
identifying which cutting element performs greater dynamic work over the duration for the plurality of time intervals; and
altering at least one cutting tool parameter corresponding to a location of the identified cutting element.

5. The method of claim 1, further comprising determining at least one of an average amplitude, an average frequency and an average duration of the dynamic work profile.

6. The method of claim 5, further comprising conducting finite element analysis on a simulated cutting element subjected to the average amplitude, the average frequency and the average duration of the dynamic work profile.

7. The method of claim 1, further comprising:
modifying at least one simulation parameter selected from a group consisting of drilling performance parameters, drilling operating parameters and bottom hole assembly parameters; and
repeating simulating, determining a true trajectory, determining a dynamic work and modifying the simulation parameters until the dynamic work on one or a plurality of cutting elements either increases or decreases.

8. The method of claim 1, further comprising determining the force acting on the cutting element during each of the plurality of time intervals.

9. A method of designing a bottom hole assembly, comprising:
simulating drilling an earth formation using the bottom hole assembly;
determining one or more cutting elements subjected to cyclic loading, wherein determining the one or more cutting elements subjected to cyclic loading comprises:
determining a force output on the one or more cutting elements;
determining a true trajectory of the one or more cutting elements, wherein the true trajectory includes a cutter position, a cutter displacement, and a cutter velocity over a time period; and
determining a dynamic work profile for the one or more cutting elements, wherein the dynamic work profile is determined using the true trajectory including the force output and the cutter displacement or the cutter velocity;
altering at least one input parameter selected from a group consisting of cutting tool parameters, drilling operating parameters and bottom hole assembly parameters; and
repeating simulating, determining and altering until a desired cutting tool design is reached having reduced cyclic loading, increased distribution of dynamic work profile, or any combination thereof.

10. The method of claim 9, wherein altering at least one input parameter comprises shoulder shape, number of cutting elements, cutting element impact resistance, cutting element fatigue strength, cutting element shape, cutting element layout, cutting element back rake and cutting element side rake.

11. The method of claim 9, further comprising conducting finite element analysis on a simulated cutting element subjected to the cyclic loading.

12. The method of claim 9, further comprising evaluating a physical cutting element by subjecting the cutting element to the cyclic loading.

13. The method of claim 9, further comprising displaying the cyclic loading of one of the cutting elements in a graphical display.

14. The method of claim 9, wherein altering comprises altering at least one characteristic of a bent motor in the bottom hole assembly selected from a second group consisting of a bend angle and a motor diameter.

15. The method of claim 9, wherein altering comprises altering at least one stabilizer parameter selected from a second group consisting of adding a stabilizer to the bottom hole assembly, altering a stabilizer placement, and altering a stabilizer type.

16. The method of claim 9, further comprising determining an average amplitude, an average frequency and an average duration of the cyclic loading.

17. A bottom hole assembly comprising:
a cutting tool having a tool body;
a first cutting element disposed on the tool body in a first region subjected to a first cyclic loading profile in a simulation of the bottom hole assembly, wherein the first region is proximate to a gage region of the cutting tool; and
a second cutting element disposed on the tool body in a second region subjected to a second cyclic loading profile in the simulation of the bottom hole assembly, wherein the first cyclic loading profile has one or more of a greater average amplitude, a greater average frequency, and a greater average duration relative to the second cyclic loading profile, and the second region is proximate to a central axis of the cutting tool;
the first cutting element having a greater impact resistance than the second cutting element, and the second cutting element having a greater wear resistance than the first cutting element.

18. The bottom hole assembly of claim 17, wherein the tool body is coupled to a drill string having a bent section.

19. The bottom hole assembly of claim 18, wherein the bent section has an adjustable bend angle.

20. The bottom hole assembly of claim 17, further comprising at least one stabilizer along a drill string coupled to the cutting tool.

21. The method of claim 9, wherein simulating drilling includes determining bottom hole assembly displacement, bottom hole assembly rotation, and the force output, and wherein determining the cutter position, the cutter displacement, and the cutter velocity are determined based on the bottom hole assembly displacement and the bottom hole assembly rotation.

22. The method of claim 21, wherein determining the true trajectory of the cutting element is conducted separately from determining the bottom hole assembly displacement and the bottom hole assembly rotation.

* * * * *